United States Patent
Awoniyi-Oteri et al.

(10) Patent No.: US 12,063,599 B2
(45) Date of Patent: Aug. 13, 2024

(54) UE MEASUREMENT REPORTING IN SECONDARY CELL GROUP DORMANCY

(71) Applicant: QUALCOMM Incorporated, San Diego, CA (US)

(72) Inventors: Olufunmilola Omolade Awoniyi-Oteri, San Diego, CA (US); Jelena Damnjanovic, Del Mar, CA (US); Tao Luo, San Diego, CA (US); Punyaslok Purkayastha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 17/343,199

(22) Filed: Jun. 9, 2021

(65) Prior Publication Data

US 2021/0400586 A1 Dec. 23, 2021

Related U.S. Application Data

(60) Provisional application No. 63/040,279, filed on Jun. 17, 2020.

(51) Int. Cl.
*H04W 52/02* (2009.01)
*H04W 24/10* (2009.01)
*H04W 52/36* (2009.01)

(52) U.S. Cl.
CPC ....... *H04W 52/0235* (2013.01); *H04W 24/10* (2013.01); *H04W 52/365* (2013.01); *H04W 52/367* (2013.01)

(58) Field of Classification Search
CPC ............. H04W 52/0235; H04W 24/10; H04W 52/365; H04W 52/367
USPC .......................................... 370/310, 328, 329
See application file for complete search history.

(56) References Cited

U.S. PATENT DOCUMENTS

| | | | |
|---|---|---|---|
| 9,992,755 B2* | 6/2018 | Yi | H04W 52/34 |
| 11,388,669 B2* | 7/2022 | Medles | H04W 52/0229 |
| 11,502,794 B2* | 11/2022 | Mochizuki | H04W 72/1268 |
| 2014/0369322 A1* | 12/2014 | Fwu | H04L 45/70 370/336 |
| 2015/0043492 A1* | 2/2015 | Baek | H04W 76/15 370/329 |
| 2015/0358924 A1* | 12/2015 | Papasakellariou | H04W 52/346 370/329 |
| 2018/0139734 A1* | 5/2018 | Babaei | H04W 72/23 |
| 2019/0215862 A1* | 7/2019 | Kim | H04W 74/0833 |
| 2019/0254110 A1* | 8/2019 | He | H04W 76/28 |
| 2020/0100128 A1* | 3/2020 | Fan | H04W 24/10 |
| 2020/0229157 A1* | 7/2020 | Rastegardoost | H04W 74/0833 |
| 2020/0244410 A1* | 7/2020 | Kim | H04W 52/0206 |
| 2022/0116874 A1* | 4/2022 | Xu | H04W 52/0235 |

\* cited by examiner

*Primary Examiner* — Obaidul Huq
(74) *Attorney, Agent, or Firm* — Arent Fox, LLP

(57) ABSTRACT

A user equipment (UE) may enter a dormant state for a secondary cell group (SCG) of a secondary network (SN) having a primary serving cell (PSCell). The UE may maintain an uplink parameter set for the PSCell while the SCG is dormant for the UE. For example, the UE may receive a parameter change message from either the SN or a master network (MN) and transmit a parameter change acknowledgment to either the SN or the MN. The UE may transmit a periodic measurement report for at least the PSCell to the PSCell of the SN based on the uplink parameter set.

30 Claims, 12 Drawing Sheets

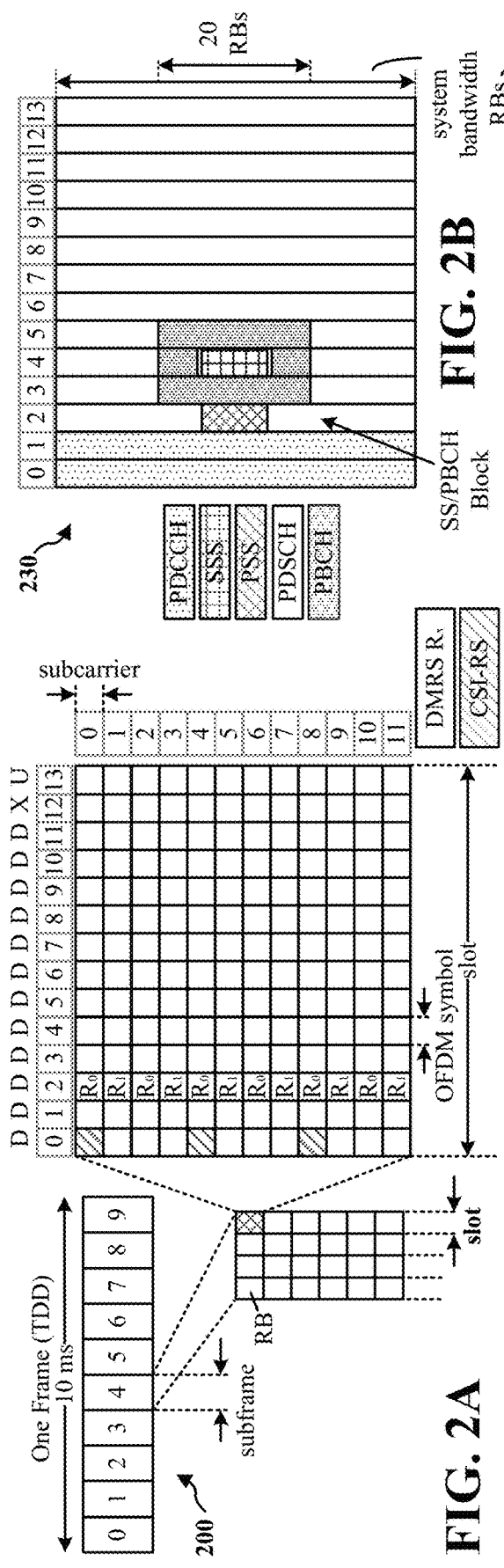
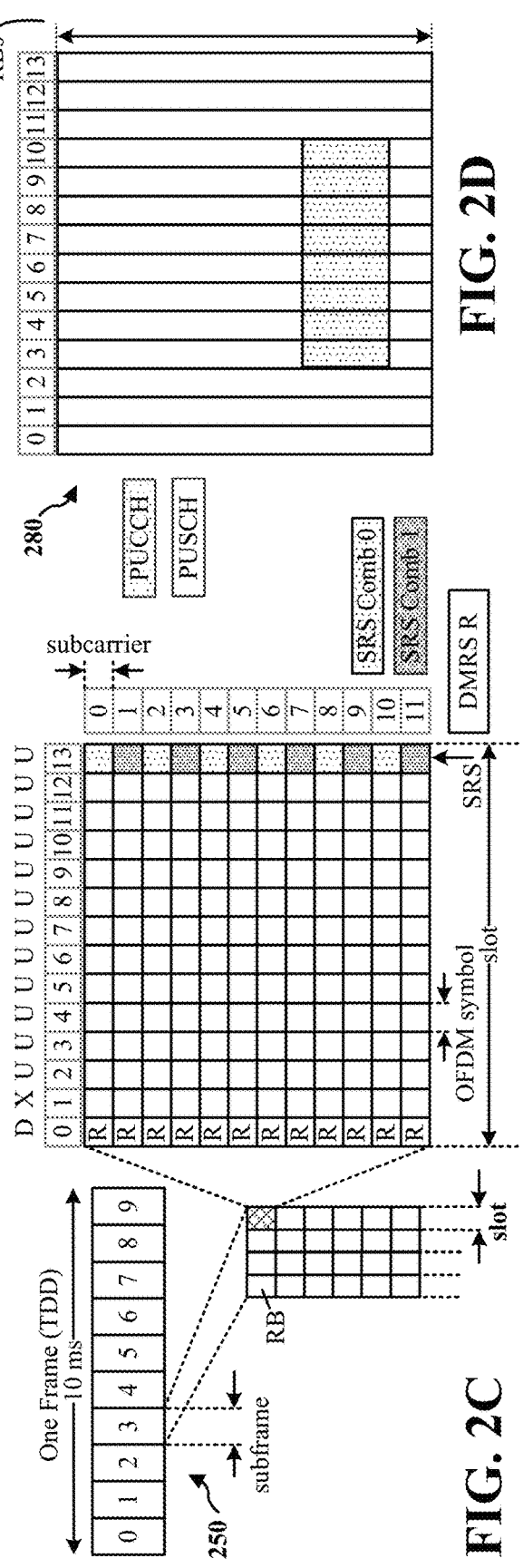

```
                                    1200
                                       ↘
                                                                    1210
┌─────────────────────────────────────────────────────────────────┐
│ Determine that a UE has entered a dormant state for the SCG      │
│ including the PSCell                                             │
└─────────────────────────────────────────────────────────────────┘
                                    ↓
                                                                    1220
┌─────────────────────────────────────────────────────────────────┐
│ Maintain an uplink parameter set for the UE for the PSCell while │
│ the UE is dormant for the SCG                                    │
│   ┌─────────────────────────────────────────────────────┐ 1222   │
│   │ Determine a parameter change based on the periodic   │       │
│   │ measurement report                                   │       │
│   └─────────────────────────────────────────────────────┘        │
│   ┌─────────────────────────────────────────────────────┐ 1224   │
│   │ Maintain the uplink parameter set for one or more    │       │
│   │ secondary cells of the SCG                           │       │
│   └─────────────────────────────────────────────────────┘        │
│   ┌─────────────────────────────────────────────────────┐ 1230   │
│   │ Transmit a parameter change message indicating the   │       │
│   │ parameter change to the UE                           │       │
│   │   ┌────────────────────────────────────────────┐ 1232│       │
│   │   │ Transmit the parameter change message via a │      │       │
│   │   │ MN including a MGC                          │      │       │
│   │   └────────────────────────────────────────────┘      │       │
│   │   ┌────────────────────────────────────────────┐ 1234 │       │
│   │   │ Transmit the parameter change message from  │      │       │
│   │   │ the PSCell of the SN during a monitoring    │      │       │
│   │   │ window following the periodic measurement   │      │       │
│   │   │ report                                      │      │       │
│   │   └────────────────────────────────────────────┘      │       │
│   │   ┌────────────────────────────────────────────┐ 1236 │       │
│   │   │ Transmit a MAC-CE indicating one or more of │      │       │
│   │   │ a TCI state for the PSCell or a timing      │      │       │
│   │   │ advance command for the PSCell              │      │       │
│   │   └────────────────────────────────────────────┘      │       │
│   │   ┌────────────────────────────────────────────┐ 1238 │       │
│   │   │ Transmit a DCI including one or more of a   │      │       │
│   │   │ TPC command for the PSCell, a TCI state     │      │       │
│   │   │ indication for the PSCell, or a timing      │      │       │
│   │   │ advance for the PSCell                      │      │       │
│   │   └────────────────────────────────────────────┘      │       │
│   └─────────────────────────────────────────────────────┘        │
│   ┌─────────────────────────────────────────────────────┐ 1240   │
│   │ Receive a parameter change acknowledgment            │       │
│   │   ┌────────────────────────────────────────────┐ 1242 │       │
│   │   │ Receive the parameter change acknowledgment │      │       │
│   │   │ via the MN                                  │      │       │
│   │   └────────────────────────────────────────────┘      │       │
│   │   ┌────────────────────────────────────────────┐ 1244 │       │
│   │   │ Receive the parameter change acknowledgment │      │       │
│   │   │ from the UE                                 │      │       │
│   │   └────────────────────────────────────────────┘      │       │
│   └─────────────────────────────────────────────────────┘        │
└─────────────────────────────────────────────────────────────────┘
                                    ↓
                                                                    1250
┌─────────────────────────────────────────────────────────────────┐
│ Receive a periodic measurement report from the UE for at least   │
│ the PSCell based on the uplink parameter set                     │
│   ┌─────────────────────────────────────────────────────┐ 1252   │
│   │ Receive a MAC-CE indicating a power headroom and a   │       │
│   │ maximum power                                        │       │
│   └─────────────────────────────────────────────────────┘        │
└─────────────────────────────────────────────────────────────────┘
```

FIG. 12

UE MEASUREMENT REPORTING IN SECONDARY CELL GROUP DORMANCY

CROSS REFERENCE TO RELATED APPLICATIONS

This application claims priority to U.S. Provisional Application No. 63/040,279 titled "UE MEASUREMENT REPORTING IN SECONDARY CELL GROUP DORMANCY," filed Jun. 17, 2020, which is assigned to the assignee hereof, and incorporated herein by reference in its entirety.

BACKGROUND

Technical Field

The present disclosure relates generally to communication systems, and more particularly, to user equipment (UE) measurement reporting in secondary cell group (SCG) dormancy.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a user equipment (UE). The method may include entering a dormant state for a secondary cell group (SCG) of a secondary network (SN) having a primary serving cell (PSCell). The method may include maintaining an uplink parameter set for the PSCell while the SCG is dormant for the UE. The method may include transmitting a periodic measurement report to the SN based on the uplink parameter set.

In some implementations, maintaining the uplink parameter set may include: receiving a parameter change message; and transmitting a parameter change acknowledgment.

For instance, in some implementations, receiving the parameter change message may include receiving the parameter change message from a master network (MN) including a master cell group (MCG), and transmitting the parameter change acknowledgment may include transmitting the parameter change acknowledgment to the MN.

In some implementations, receiving the parameter change message may include receiving the parameter change message from the PSCell of the SN during a monitoring window following the periodic measurement report, and transmitting the parameter change acknowledgment may include transmitting the parameter change acknowledgment to the SN. Transmitting the parameter change acknowledgment may include transmitting a separate message or including the parameter change acknowledgment in a subsequent periodic measurement report.

In some implementations, receiving the parameter change message includes receiving the parameter change message from a MN including a MCG, and transmitting the parameter change acknowledgment includes transmitting the parameter change acknowledgment to the SN.

In some implementations, receiving the parameter change message may include receiving a media access control (MAC) control element (MAC-CE) indicating one or more of a transmission configuration indicator (TCI) state for the PSCell or a timing advance command for the PSCell. The MAC-CE may include at least one of a TCI state for one or more secondary cells of the SCG or a timing advance command for one or more secondary cells of the SCG.

In some implementations, receiving the parameter change message may include receiving a downlink control information (DCI) including one or more of a transmit power control (TPC) command for the PSCell, a TCI state indication for the PSCell, or a timing advance for the PSCell. The DCI may include at least one of a TPC command for one or more secondary cells of the SCG or a TCI state indication for one or more secondary cells of the SCG.

In some implementations, transmitting the periodic measurement report may include transmitting a indicating a power headroom and a maximum power. The MAC-CE may include a power headroom and a maximum power for multiple secondary cells.

In some implementations, maintaining the uplink parameter set may include maintaining the uplink parameter set for one or more secondary cells of the SCG.

The disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

In an aspect, the disclosure provides a method of wireless communication for a PSCell of a SCG. The method may include determining that a UE has entered a dormant state for the SCG including the PSCell. The method may include maintaining an uplink parameter set for the UE for the PSCell while the UE is dormant for the SCG. The method may include receiving a periodic measurement report for at least the PSCell from the UE based on the uplink parameter set.

In some implementations, maintaining the uplink parameter set includes: determining a parameter change based on the periodic measurement report; transmitting a parameter change message indicating the parameter change to the UE; and receiving a parameter change acknowledgment.

In some implementations, transmitting the parameter change message may include transmitting the parameter change message via a MN including a MCG, and receiving the parameter change acknowledgment may include receiving the parameter change acknowledgment via the MN.

In some implementations, transmitting the parameter change message may include transmitting the parameter change message from the PSCell of the SN during a monitoring window following the periodic measurement report, and receiving the parameter change acknowledgment may include receiving the parameter change acknowledgment from the UE.

In some implementations, receiving the parameter change acknowledgment may include receiving a separate message for the parameter change acknowledgment or receiving the parameter change acknowledgment in a subsequent periodic measurement report.

In some implementations, transmitting the parameter change message may include transmitting the parameter change message via a MN including a MCG, and receiving the parameter change acknowledgment may include receiving the parameter change acknowledgment from the SN.

In some implementations, transmitting the parameter change message may include transmitting a MAC-CE indicating one or more of a TCI state for the PSCell or a timing advance command for the PSCell. The MAC-CE may include at least one of a TCI state for one or more secondary cells of the SCG or a timing advance command for one or more secondary cells of the SCG.

In some implementations, transmitting the parameter change message comprises transmitting a DCI including one or more of a TPC command for the PSCell, a TCI state indication for the PSCell, or a timing advance for the PSCell. The DCI may include at least one of a TPC command for one or more secondary cells of the SCG or a TCI state indication for one or more secondary cells of the SCG.

In some implementations, receiving the periodic measurement report includes receiving a MAC-CE indicating a power headroom and a maximum power. The MAC-CE may include a power headroom and a maximum power for multiple secondary cells.

In some implementations, maintaining the uplink parameter set may include maintaining the uplink parameter set for one or more secondary cells of the SCG.

The disclosure also provides an apparatus (e.g., a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G NR frame.

FIG. 2B is a diagram illustrating an example of DL channels within a 5G NR subframe.

FIG. 2C is a diagram illustrating an example of a second 5G NR frame.

FIG. 2D is a diagram illustrating an example of a 5G NR subframe.

FIG. 12 is a flowchart of an example of a method of wireless communication for a base station.

DETAILED DESCRIPTION

Figure 1:
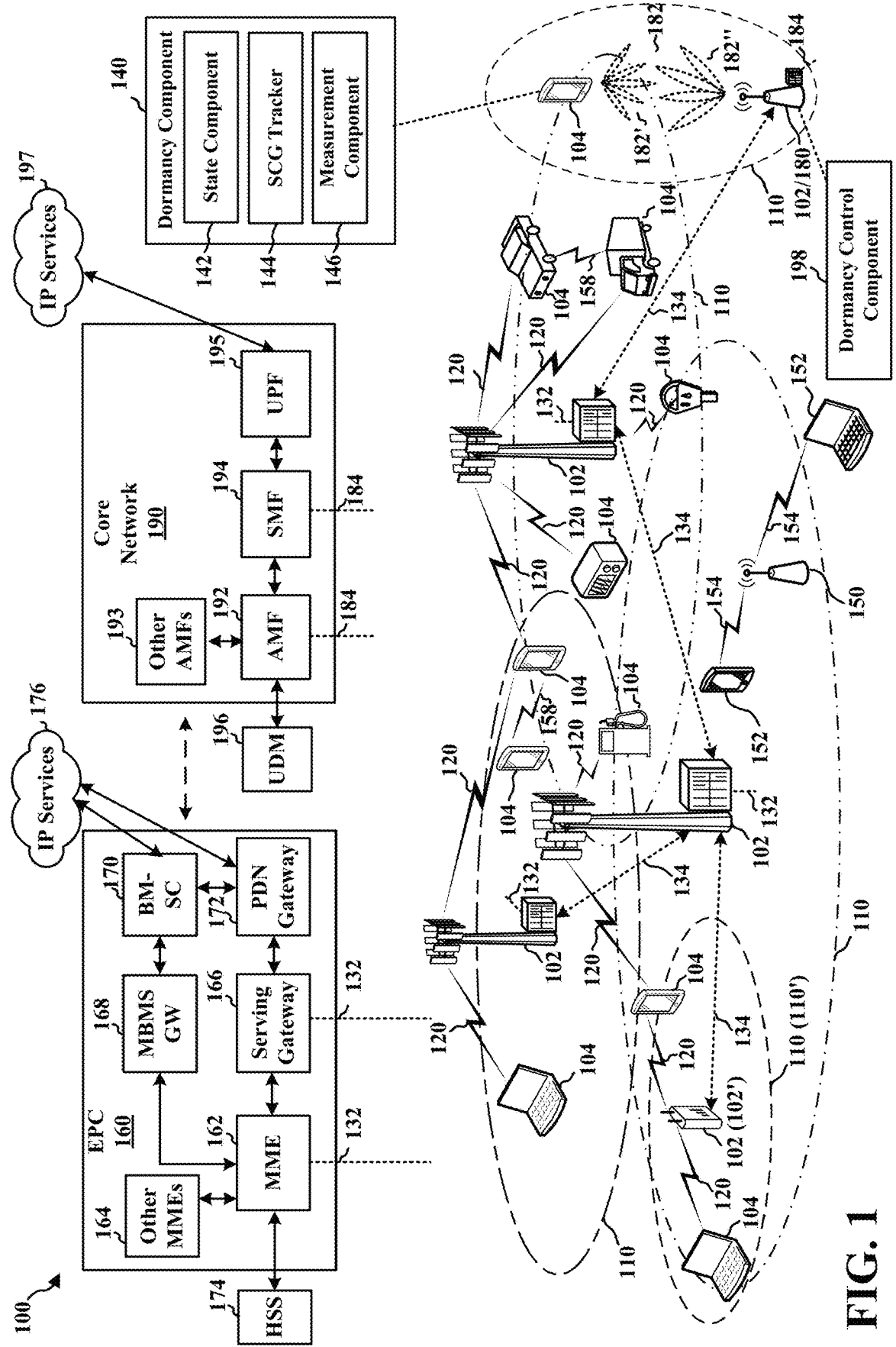
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Multiple-radio dual-connectivity (MR-DC) may allow a user equipment (UE) to communicate with two radio access networks, for example, utilizing two frequency bands. One radio network may be referred to as a master network (MN)

and the other network may be referred to as the secondary network (SN). The UE may communicate with a group of cells in each network. For example, the MN may include a master cell group (MCG) and the SN may include a secondary cell group (SCG). In some scenarios, the SCG for the UE may be dormant. For instance, when a data rate for the UE is sufficiently low, the SCG for the UE may be placed in a dormant state. The dormant state may have reduced power consumption. For example, in the dormant state, the UE may not monitor a control channel for the SCG.

During a dormant state, however, the UE may perform periodic measurements and reporting. In some respects, the SCG dormancy may be similar to secondary cell dormancy in carrier aggregation (CA). In CA, the connection from the UE to the primary cell (PCell) remains active, so the UE may provide measurement reports for the secondary cells to the PCell. In contrast, in SCG dormancy, the connection between the UE and the primary serving cell (PSCell) of the SCG is dormant.

One option for performing measurement reports during SCG dormancy is for the UE to transmit measurement reports for the SCG via the MN and MCG. However, because the MN and SN may be separate access networks, there may be additional latency involved in the measurement reporting.

Another option for performing measurement reports during SCG dormancy is for the UE to transmit the measurement reports for the SCG to the PSCell of the SCG. Although the UE may not monitor a control channel of the SCG, the SCG may remain active and receive a physical uplink control channel (PUCCH) from the UE. Such uplink transmissions, however, may utilize an uplink parameter set for the PSCell. In particular, the uplink parameter set may include uplink transmission parameters such as cell timing, transmission control indicator (TCI) states, and uplink transmit power.

In an aspect, the present disclosure provides for the UE and the PSCell to maintain the parameter set for the PSCell while the SCG is dormant for the UE. For example, the UE may enter a dormant state for a SCG of a SN having a PSCell. The PSCell may update the parameter set based on received measurement reports. The UE may maintain a parameter set for the PSCell while the SCG is dormant for the UE based on parameter changes messages from the SN. For example, the UE may receive a parameter change message from either the SN or the MN and transmit a parameter change acknowledgment to either the SN or the MN. The UE may transmit a periodic measurement report to the SN based on the parameter set.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, as illustrated, one or more of the UEs 104 may include a dormancy component 140 that reports measurements while the UE 104 is in an SCG dormancy state. For example, the UE may enter the SGC dormancy state when scenarios such as low traffic on the network occur. The dormancy component 140 may include a state component 142 configured to cause the UE to enter a dormant state for a SCG of a SN having a PSCell; a SCG tracker 144 configured to maintain a parameter set for the PSCell while the SCG is dormant for the UE; and a measurement component 146 configured to transmit a periodic measurement report to the SN based on the parameter set.

In an aspect, as illustrated, one or more of the base stations 102 may include a dormancy control component 198 that receives periodic measurement reports from a UE in an SCG dormancy state. As illustrated in further detail in FIG. 8, dormancy control component 198 may include a UE state component 840 configured to determine that a UE has entered a dormant state for a secondary network (SN) including the PSCell and the SCG, a parameter set component 842 configured to maintain a parameter set for the UE for the PSCell while the UE is dormant for the SCG, and a report receiving component 844 configured to receive a periodic measurement report from the UE based on the parameter set.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
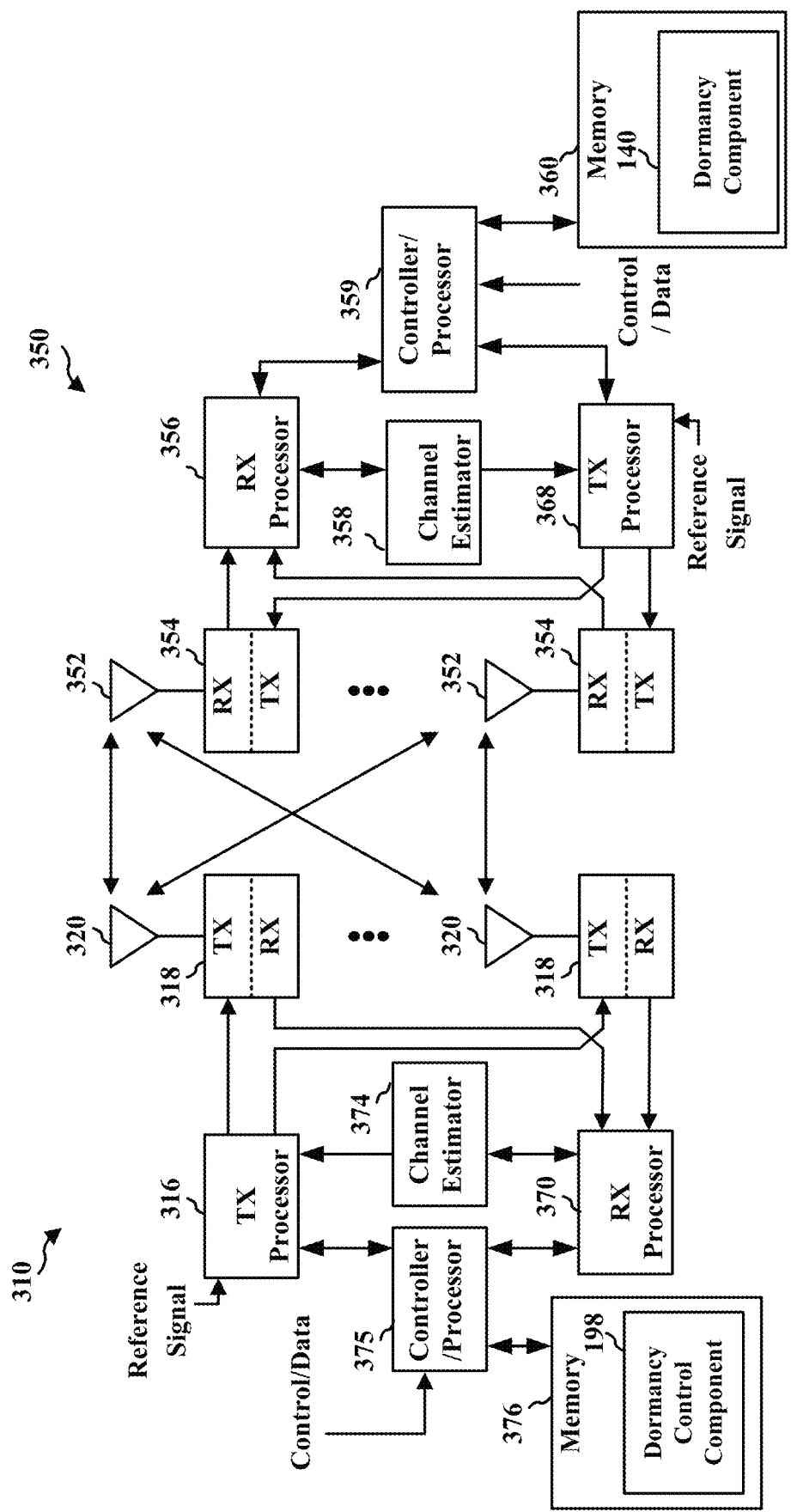
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the dormancy component 140 of FIG. 1. For example, the memory 360 may include executable instructions defining the dormancy component 140. The TX processor 368, the RX processor 356, and/or the controller/processor 359 may be configured to execute the dormancy component 140.

At least one of the TX processor 316, the RX processor 370, and the controller/processor 375 may be configured to perform aspects in connection with the dormancy control component 198 of FIG. 1. For example, the memory 376 may include executable instructions defining the dormancy control component 198. The TX processor 316, the RX processor 370, and/or the controller/processor 375 may be configured to execute the dormancy control component 198.

Figure 4:
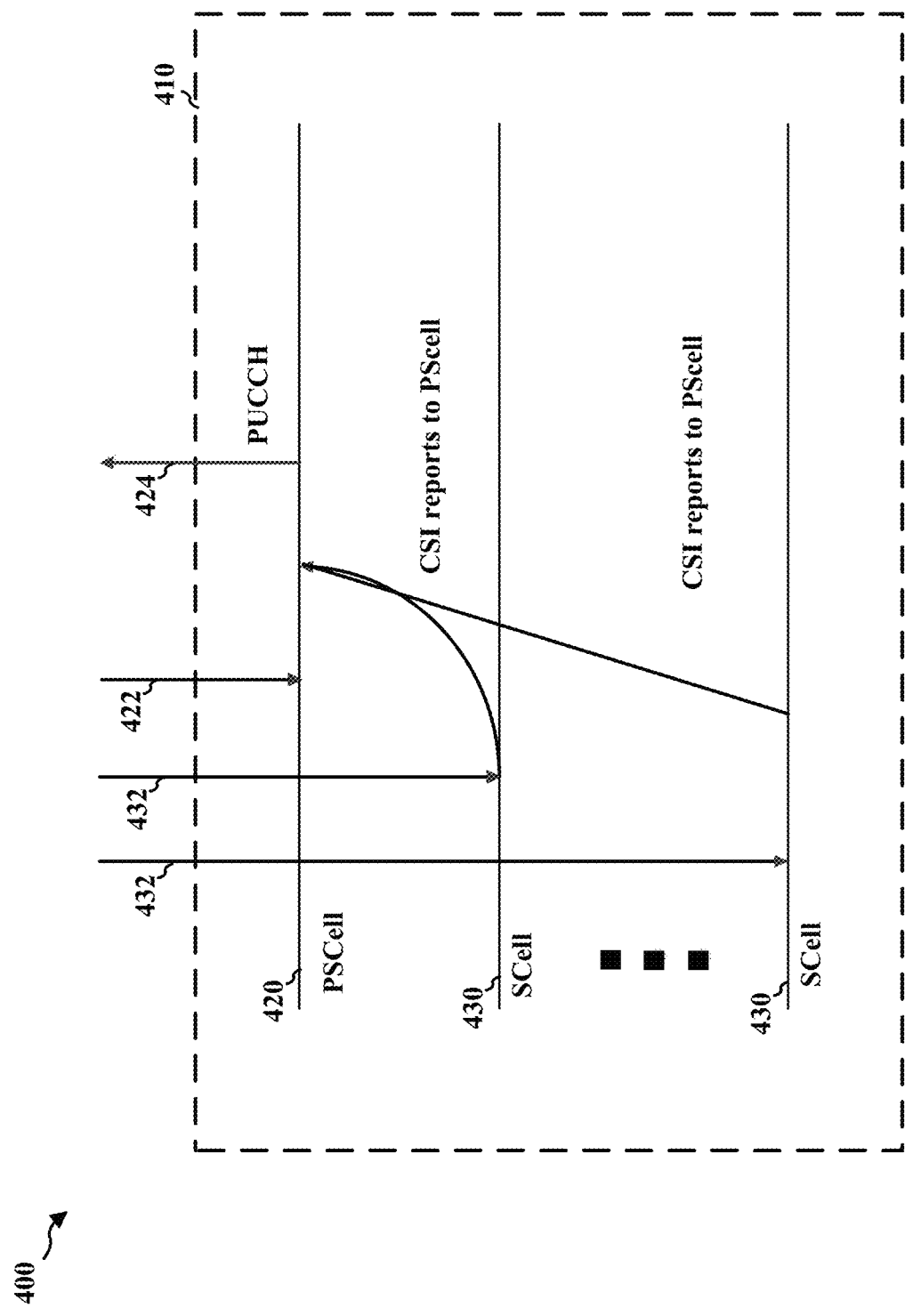
FIG. 4 is a diagram illustrating example UE measurements for a secondary cell group (SCG).

FIG. 4 is a diagram 400 illustrating example UE measurements for SCG 410. The SCG 410 may include a primary serving cell (PSCell) 420 and optional secondary cells 430. In an aspect, the UE 104 may be in a dormant state for the SCG 410. Accordingly, the UE 104 may only perform the measurements during a periodic measurement window to generate a periodic measurement report. The PSCell 420 may receive downlink reference signal 422 (e.g., a channel state information reference signal (CSI-RS)) and perform channel state information (CSI) measurements. Similarly, the SCells 430 may receive respective downlink reference signals 432 and perform CSI measurements. To reduce signaling from the UE during the SCG dormancy state, the UE 104 may provide CSI measurement reports for the SCells 430 via the PSCell 420. For example, the UE 104 may transmit a physical uplink control channel (PUCCH) to the PSCell 420 that includes the CSI reports for the PSCell 420 and each SCell 430.

Figure 5:
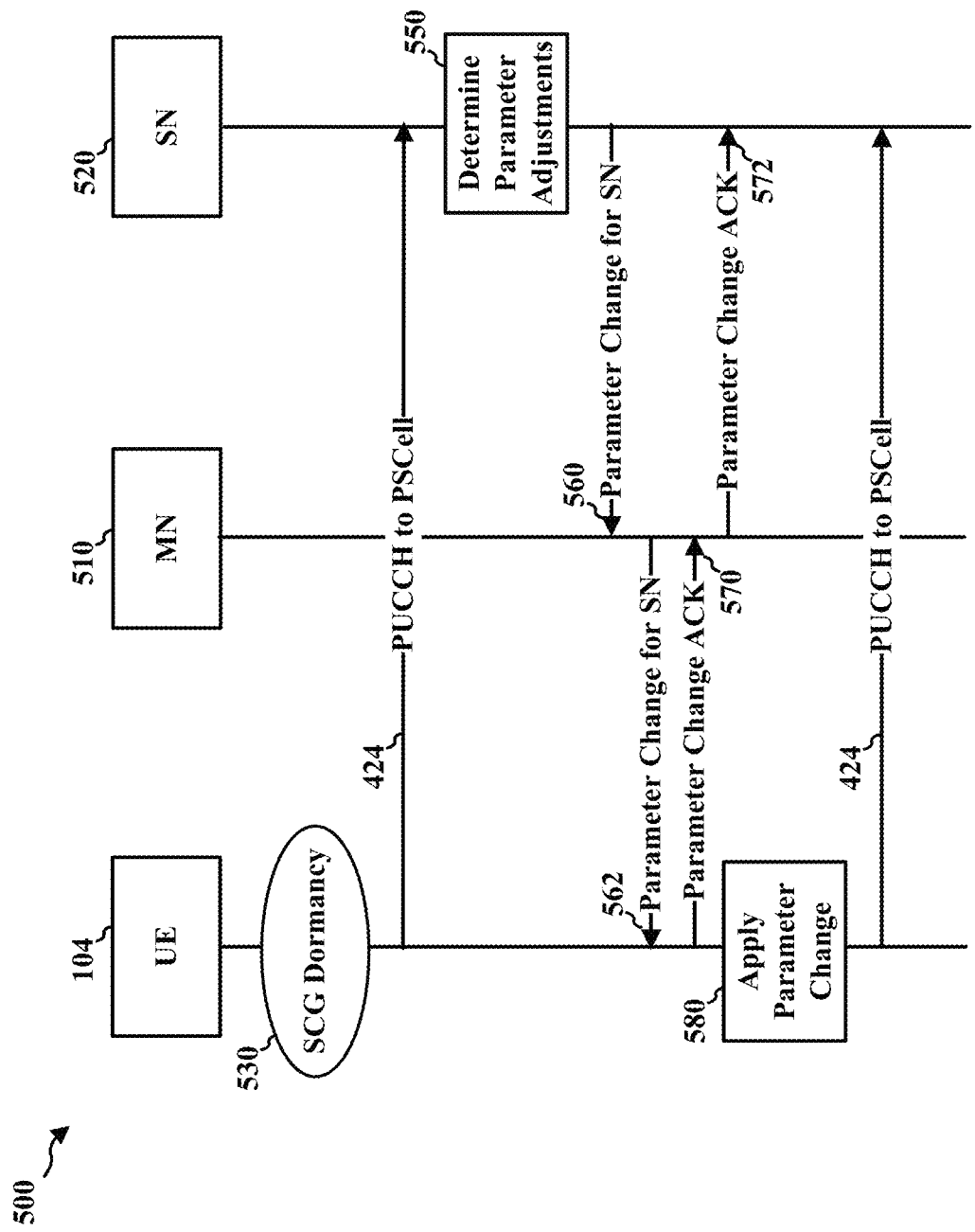
FIG. 5 is a diagram illustrating example parameter updates via a master network (MN) during SCG dormancy.

FIG. 5 is a diagram 500 illustrating example parameter updates via a MN 510 during SCG dormancy. The UE 104 and the SN 520 may maintain a set of parameters for the UE to transmit the PUCCH 424 to the PSCell 420. For instance, at block 530, the UE 104 may enter SCG dormancy. The UE 104 may transmit a first PUCCH 424 to the PSCell 420, for example, based on parameters prior to entering the SCG dormancy. In block 550, based on the CSI measurement report, the SN 520 may determine one or more parameter adjustments to the set of parameters. For example, the SN 520 may change one or more uplink transmission parameters such as cell timing, TCI state, or uplink transmit power. For a parameter update via the MN 510, the SN 520 may transmit a parameter change message 560 to the MN 510 via a backhaul, and the MN 510 may transmit the parameter change message 562 to the UE 104. The UE 104 may acknowledge (ACK) the parameter change message 560/562 by transmitting a parameter change ACK 570 to the MN 510, which may then transmit a parameter change ACK 572 to the SN 520 via a backhaul. At block 580, the UE 104 may apply the one or more parameter changes. In some implementations, the block 580 may occur before transmitting the parameter change ACK 570. After block 580, the UE 104 may transmit a subsequent PUCCH 424 using the updated parameter set. Accordingly, the UE 104 and the SN 520 may maintain the uplink transmission parameters. Additionally, the uplink transmission parameters may be utilized when the UE 104 exits the SCG dormancy state. For example, after receiving a command from the MN 510 to exit the SCG dormancy state, the UE 104 may utilize the uplink parameters to transmit a scheduling request. Because the uplink transmission parameters are maintained, the latency for communications after exiting the SCG dormancy state may be reduced.

Figure 6:
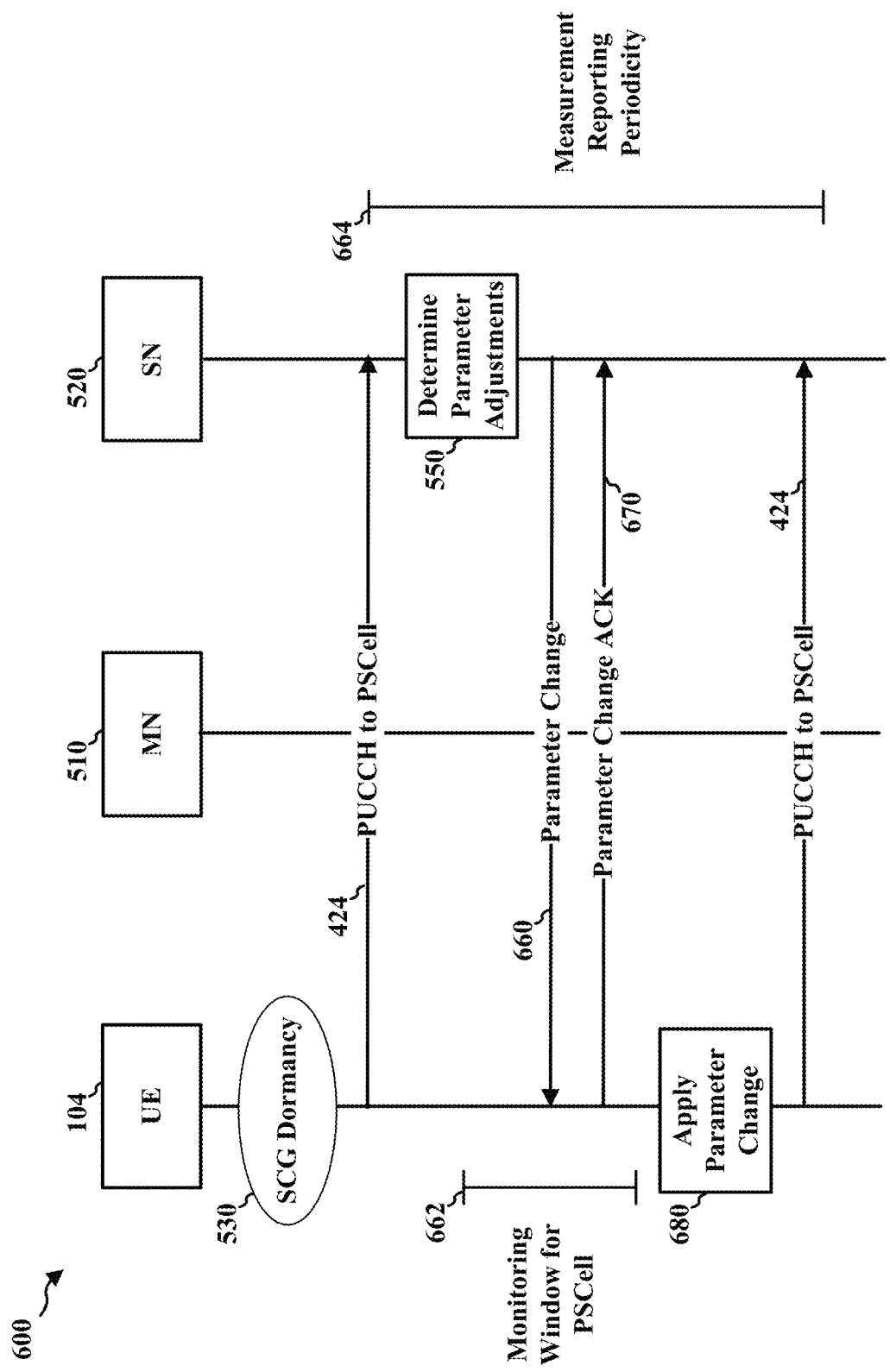
FIG. 6 is a diagram illustrating example parameter updates via a secondary network (SN) during SCG dormancy.

FIG. 6 is a diagram 600 illustrating example parameter updates via the SN 520 during SCG dormancy. In an aspect, direct communication between the SN 520 and the UE 104 may reduce latency compared to the procedures of FIG. 5, but with increased power consumption by the UE 104. The increase in power consumption, however, may be mitigated or reduced. Similar to FIG. 5, the UE 104 and the SN 520 may maintain a set of parameters for the UE to transmit the PUCCH 424 to the PSCell 420. For instance, at block 530, the UE 104 may enter SCG dormancy. The UE 104 may transmit the first PUCCH 424 to the PSCell 420, and in block 550, based on the CSI measurement report, the SN 520 may determine a parameter adjustment to the set of parameters. For direct SN communications, the SN 520 may transmit a parameter change message 660 directly to the UE 104. Because the UE 104 is in SCG dormancy, the UE 104 may not normally monitor messages from the SN 520. In an aspect, the UE 104 may be configured with a monitoring window 662 for the PSCell. The monitoring window 662 may be based on the PUCCH 424. For example, the monitoring window 662 may start after a round trip time after transmitting the PUCCH 424 and extend for a relatively short period (e.g., 2-4 ms) to allow flexibility in scheduling by the PSCell. The monitoring window 662 may be relatively short compared to the measurement reporting periodicity 664, which may be, for example, 20 ms, 40 ms, 80 ms, or longer. Accordingly, the portion of time during which the UE 104 monitors the PSCell and consumes power may be relatively small. The UE 104 may transmit a parameter change ACK 670 in response to receiving the parameter change message 660. At block 680, the UE 104 may apply the one or more parameter changes. The UE 104 may transmit the PUCCH 424 using the new parameters after the block 680. In an aspect, the parameter change ACK 670 may be transmitted after the block 680 using the new parameters. For example, the parameter change ACK 670 may be included with the PUCCH 424 using the new parameters.

Figure 7:
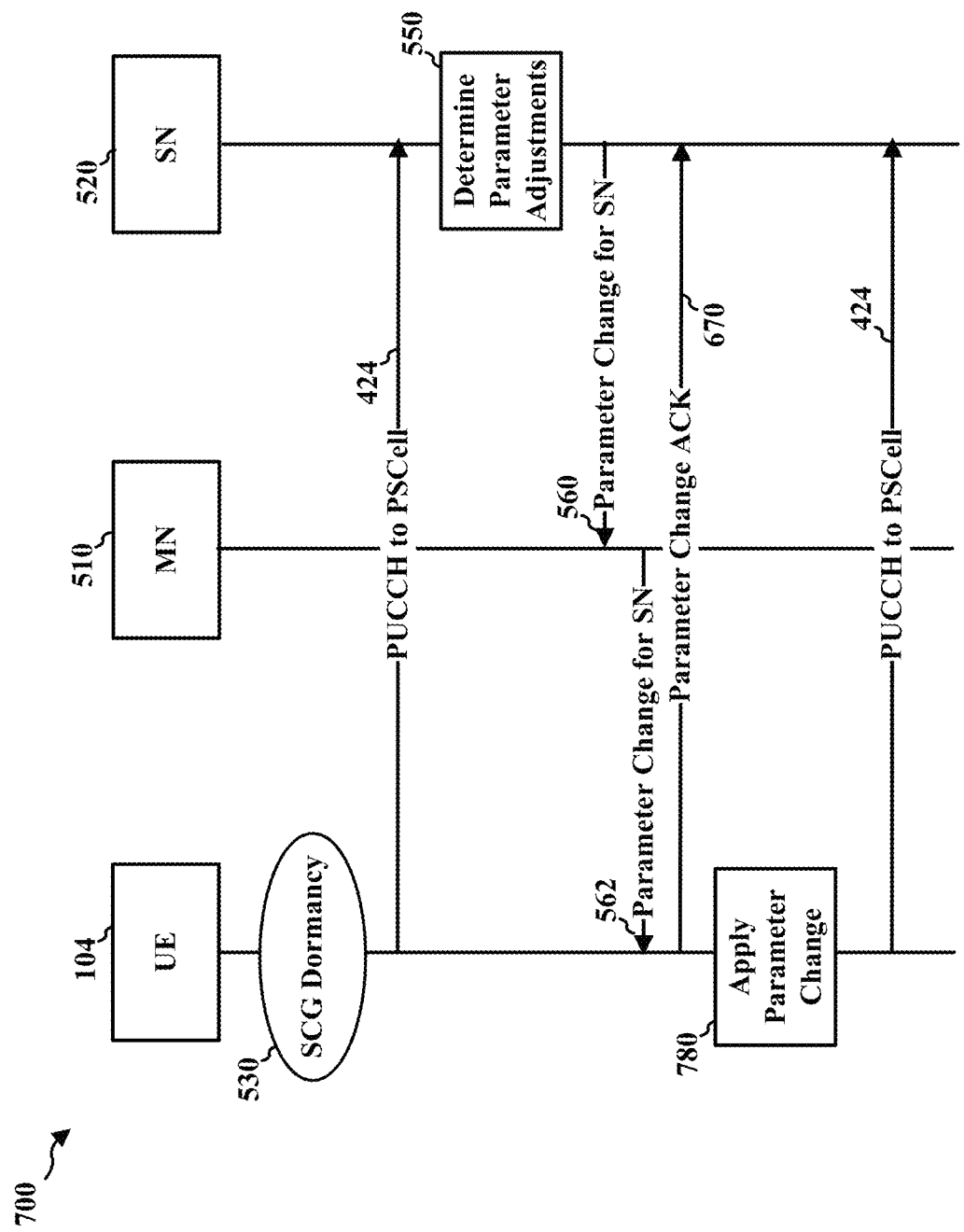
FIG. 7 is a diagram illustrating example parameter updates using hybrid communications during SCG dormancy.

FIG. 7 is a diagram 700 illustrating example parameter updates using hybrid communications during SCG dormancy. Similar to FIG. 5, the UE 104 and the SN 520 may maintain a set of parameters for the UE to transmit the PUCCH 424 to the PSCell 420. For instance, at block 530, the UE 104 may enter SCG dormancy. The UE 104 may transmit the first PUCCH 424 to the PSCell 420, and in block 550, based on the CSI measurement report, the SN 520 may determine one or more parameter adjustments to the set of parameters. For hybrid communications, the SN 520 may transmit the parameter change message 560 via the MN 510, but receive the parameter change ACK 670 directly from the UE 104. In particular, the SN 520 may transmit the parameter change message 560 to the MN 510, which may transmit the parameter change message 562 to the UE 104. Because the UE receives the parameter change message 562 from the MN, which is not dormant, the monitoring window 662 for the PSCell is not needed. The UE 104, however, may transmit the parameter change ACK 670 to the SN 520. The parameter change ACK 670 to the SN 520 may use approximately the same power as the parameter change ACK 570 to the MN 510, so there is no significant additional power consumption, but some decrease in latency compared to FIG. 5. The UE 104 may apply the parameter changes in block 780. Once again, the UE 104 may transmit the PUCCH 424 after the block 780 using the updated parameters. In some implementations, the parameter change ACK 670 may be transmitted after the block 780 with the PUCCH 424.

Figure 8:
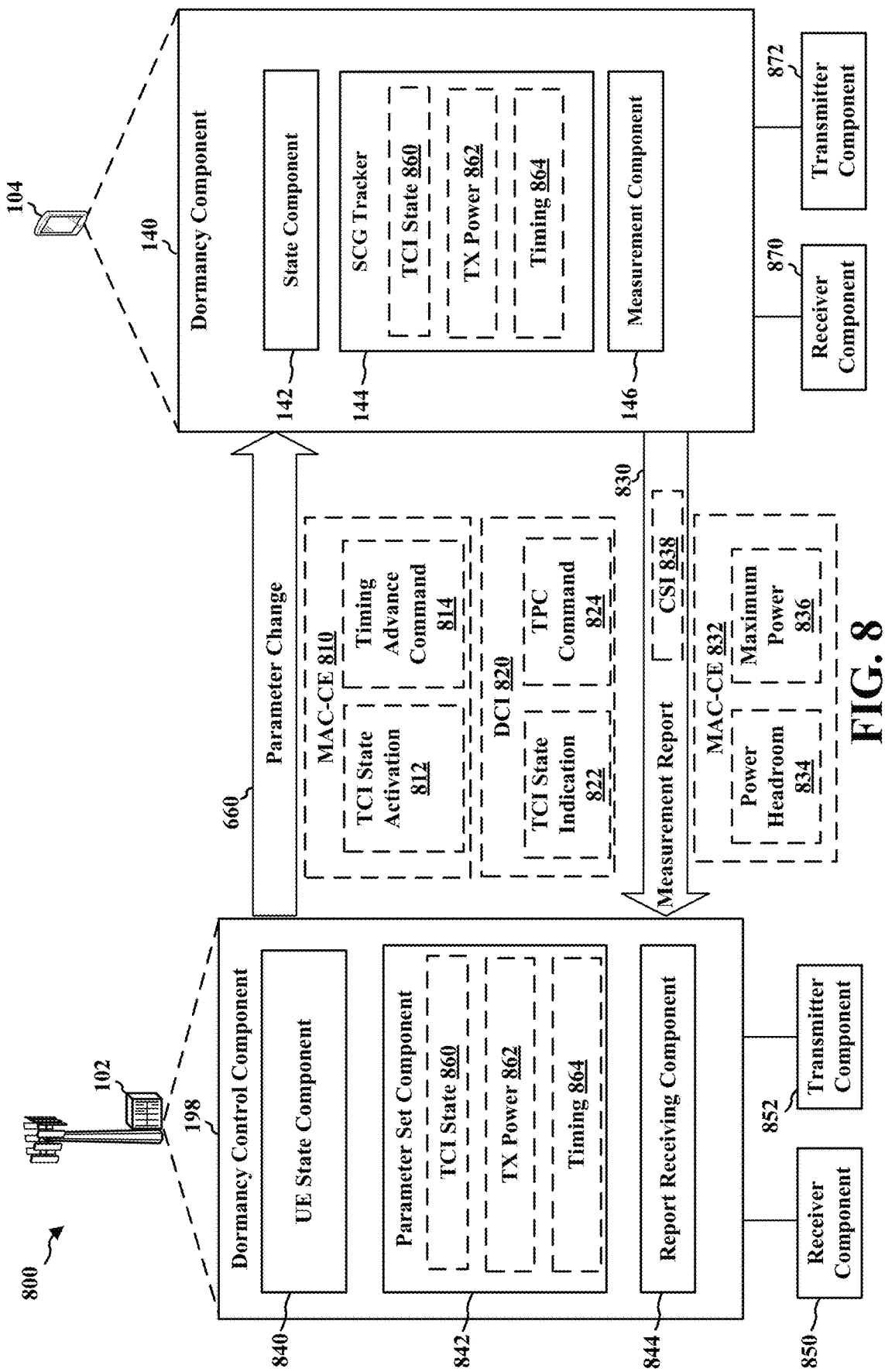
FIG. 8 is a diagram illustrating example communications and components of a base station and a UE.

FIG. 8 is a diagram 800 illustrating example communications and components of a base station 102 and a UE 104. The UE 104 may include the dormancy component 140. The base station 102 may include the dormancy control component 198. The dormancy control component 198 may be implemented by the memory 376 and the TX processor 316, the RX processor 370, and/or the controller/processor 375 of FIG. 3. For example, the memory 376 may store executable instructions defining the dormancy control component 198 and the TX processor 316, the RX processor 370, and/or the controller/processor 375 may execute the instructions. The dormancy component 140 may be implemented by the memory 360 and the TX processor 368, the RX processor 356, and/or the controller/processor 359. For example, the memory 360 may store executable instructions defining the dormancy component 140 and the TX processor 368, the RX processor 356, and/or the controller/processor 359 may execute the instructions.

As discussed above regarding FIG. 1, dormancy component 140 may include the state component 142, the SCG tracker 144, and the measurement component 146. The UE 104 may also include a receiver component 870 and a transmitter component 872. The receiver component 870 may include, for example, a radio-frequency (RF) receiver for receiving the signals described herein. The transmitter component 872 may include for example, an RF transmitter for transmitting the signals described herein. In an aspect, the receiver component 870 and the transmitter component 872 may be co-located in a transceiver such as illustrated by the TX/RX 354 in FIG. 3.

The dormancy control component 198 may include the UE state component 840, the parameter set component 842, and the report receiving component 844. The base station 102 may also include a receiver component 850 and a transmitter component 852. The receiver component 850 may include, for example, a RF receiver for receiving the signals described herein. The transmitter component 852 may include for example, an RF transmitter for transmitting the signals described herein. In an aspect, the receiver component 850 and the transmitter component 852 may be co-located in a transceiver such as illustrated by the TX/RX 318 in FIG. 3.

The dormancy control component 198 may transmit the parameter change message 660 at either the MAC layer or the PHY layer. For example, at the MAC layer, the dormancy control component 198 may transmit a MAC control element (MAC-CE) 810. The MAC-CE 810 may include a TCI state activation 812 and/or a timing advance command 814. Conventional MAC-CEs for TCI state activation may specify a specific serving cell. The TCI state activation 812 may be expanded to indicate a TCI state for multiple serving cells (e.g., the PSCell 420 and one or more SCells 430). Similarly, a conventional timing CE may include a timing advance group (TAG) ID and timing advance command. The timing advance command 814 may be expanded to include multiple TAG IDs and corresponding timing advance commands.

As another example, at the PHY layer, the dormancy control component 198 may transmit a DCI 820. The DCI 820 may include a TCI state indication 822, and a TPC command 824. A conventional DCI (e.g., DCI format 1_1) may specify a single cell ID. The DCI 820 may be expanded to include the TCI state indication 822 and/or the TPC command 824 for multiple cells. For example, the DCI 820 may include an additional field indicating whether the TCI state indication 822 and/or TPC command 824 are applicable to other cells in the SCG. As another example, the fields for the TCI state indication 822 and/or TPC command 824 may be expanded to include values for additional cells, which may be applied to the other cells in the SCG. In another aspect, a new DCI format may be configured for a UE operating in the SCG dormancy state, or a different interpretation of the DCI format 1_1 may be applied when the UE is operating in the SCG dormancy state.

The dormancy component 140 may transmit a measurement report 830 at the PHY and/or MAC layers. At the PHY layer, the measurement report 830 may include the PUCCH 424. The PUCCH 424 may carry uplink control information (UCI) including an ACK/NACK, scheduling request (SR), and/or CSI 838. The CSI 838 may include the periodic measurements of the SCG. At the MAC layer, the measurement report 830 may include a power control information including a MAC-CE 832 for a power headroom report. The MAC-CE 832 may include a power headroom 834 and a maximum power 836. In an aspect, the fields for the power headroom 834 and a maximum power 836 may be expanded to include values for each cell in the SCG 410.

Figure 9:
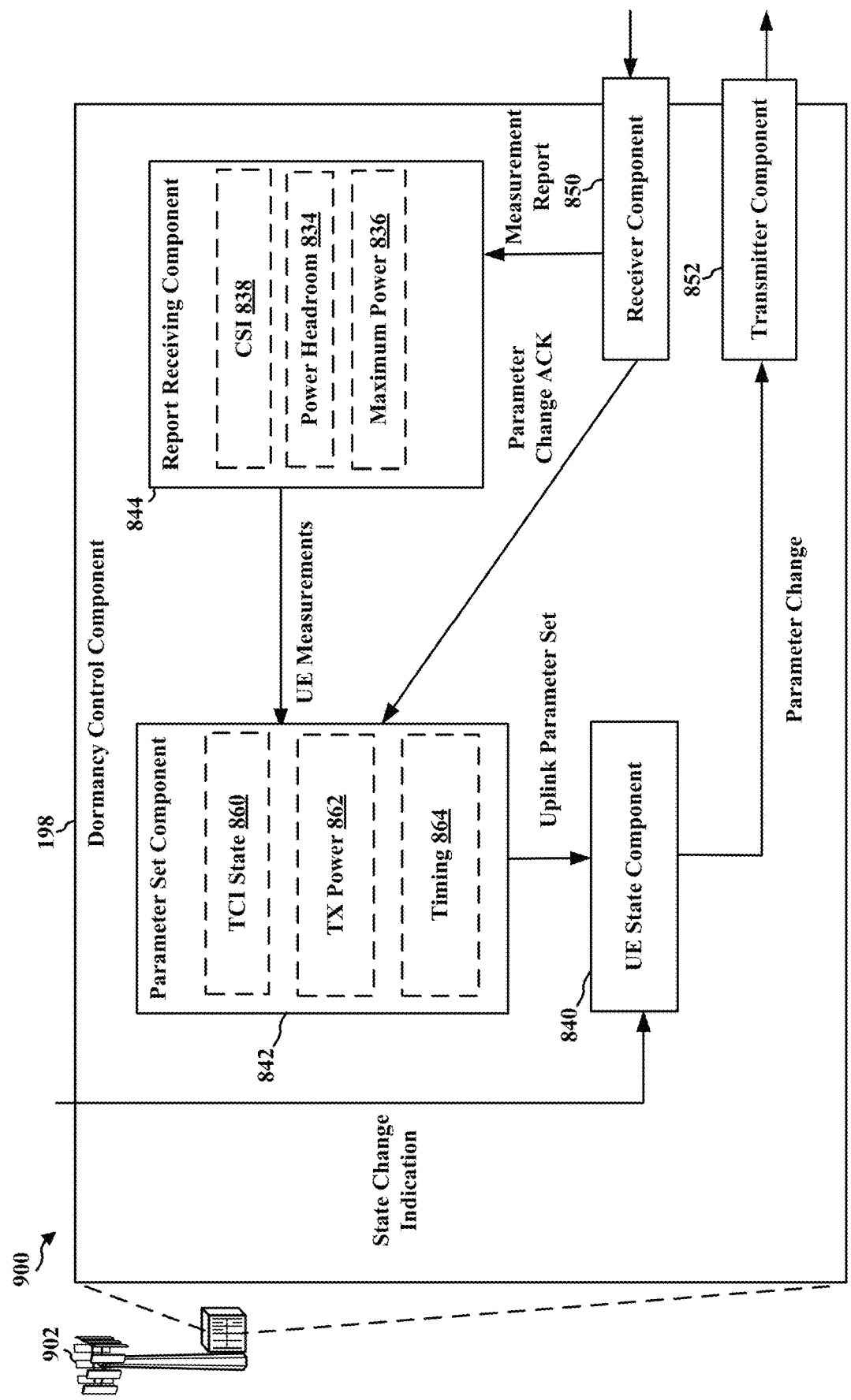
FIG. 9 is a conceptual data flow diagram illustrating the data flow between different means/components in an example UE.

FIG. 9 is a conceptual data flow diagram 900 illustrating the data flow between different means/components in an example base station 902, which may be an example of the base station 102 (or base station 310) including the dormancy control component 198 with reference to FIGS. 1, 3, and 8.

The receiver component 850 may receive uplink signals from the UE 104 including the measurement report 830 and the parameter change ACK 670. The receiver component 850 may provide the measurement report 830 to the report receiving component 844. The receiver component 850 may provide the parameter change ACK 670 to the parameter set component 842.

The report receiving component 844 may receive the measurement report 830 from the receiver component 850. The report receiving component 844 may extract measurements from the measurement report 830. For example, the report receiving component 844 may determine the CSI 838 based on a UCI carried on the PUCCH 424. The report receiving component 844 may determine the power headroom 834 and the maximum power 836 based on the power headroom report MAC-CE 832. The report receiving component 844 may provide the UE measurements to the parameter set component 842.

The parameter set component 842 may receive the UE measurements from the report receiving component 844 and the parameter change ACK 670 from the receiver component 850. The parameter set component 842 may determine whether to adjust the uplink transmission parameters. For example, the parameter set component 842 may determine whether the UE 104 is able to increase transmission power based on the power headroom 834 and maximum power 836. The parameter set component 842 may determine whether to adjust the timing 864 based on the CSI 838. The parameter set component 842 may determine whether to change a TCI state 860 based on the CSI 838. If the parameter set component 844 changes any uplink parameters, the parameter set component 844 may provide the uplink parameter set to the UE state component 840.

The UE state component 840 may receive the uplink parameter set from the parameter set component 842. The UE state component 840 may receive a state change indication the MN 510 via a backhaul. For example, the MN 510 may transmit an RRC message to the UE indicating that the UE should enter the SCG dormancy state and send the state change indication to the PSCell. The UE state component 840 may determine that the UE 104 has entered the dormant state for the SCG based on the state change indication. The UE state component 840 may determine how to transmit the parameter change message 560/660 based on the state of the UE. For example, when the UE 104 is in the SCG dormancy state, the UE state component 840 may transmit the parameter change message 660 during the monitoring window 662 to the UE 104 via the transmitter component 852. Alternatively, if the UE 104 is configured with communication via the MN 510 or hybrid communication, the UE state component 840 may transmit parameter change message 560 to the MN 510 via the transmitter component 852 while the UE 104 is in the SCG dormancy state.

Figure 10:
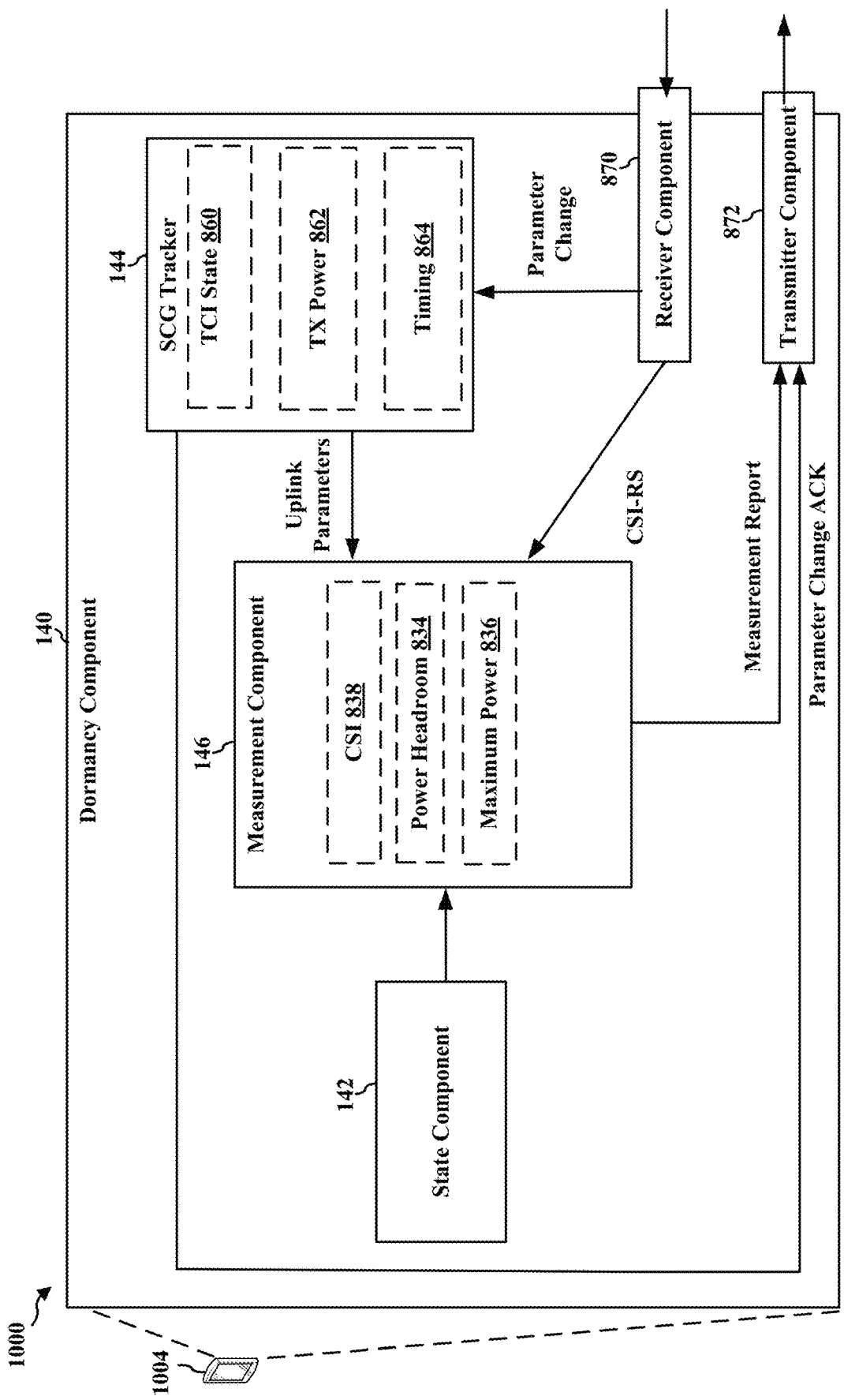
FIG. 10 is a conceptual data flow diagram illustrating the data flow between different means/components in an example base station.

FIG. 10 is a conceptual data flow diagram 1000 illustrating the data flow between different means/components in an example UE 1004, which may be an example of the UE 104 (or UE 350) and include the dormancy component 140 with reference to FIGS. 1, 3, and 8.

The receiver component 870 may receive the parameter change message 560/660 and the CSI-RS from one or more base stations. The receiver component 870 may provide the parameter change message 560/660 to the SCG tracker 144. The receiver component 870 may provide the CSI-RS to the measurement component 146.

The state component 142 may cause the UE 104 to enter the SCG dormancy state. For example, the state component 142 may receive an RRC command from the MN 510 to enter the SCG dormancy state. The state component 142 may provide an indication of the SCG dormancy state to the measurement component 146. For example, the state component 142 may indicate the measurement reporting periodicity 664 to use during the SCG dormancy state.

The SCG tracker 144 may receive the parameter change message 560/660 from the receiver component 870. The SCG tracker 144 may extract uplink transmission parameters from the parameter change message 560/660. For example, the SCG tracker 144 may determine the TCI state 860 based on the TCI state activation 812 and/or the TCI state indication 822. The SCG tracker 144 may determine the TX power 862 based on the TPC command 824. The SCG tracker 144 may determine the timing 864 based on the timing advance command 814. The SCG tracker 144 may provide the uplink parameters to the measurement component 146. The SCG tracker 144 may generate a parameter change ACK 570/670 in response to the parameter change message 560/660. In some implementations, the SCG tracker 144 may include the parameter change ACK 570/670 in the measurement report 830.

The measurement component 146 may receive the CSI-RS from the receiver component 870 and may receive the uplink parameters from the SCG tracker 144. The measurement component 146 may measure the CSI-RS to determine the CSI 838. The measurement component 146 may determine to transmit the measurement report 830 including the CSI-RS using the uplink parameters. The measurement component 146 may determine a power headroom 834 and maximum power 836 based on the TX power 862 and a power supply. The measurement component 146 may include the MAC-CE 832 including the power headroom 834 and the maximum power 836 in the measurement report 830.

Figure 11:
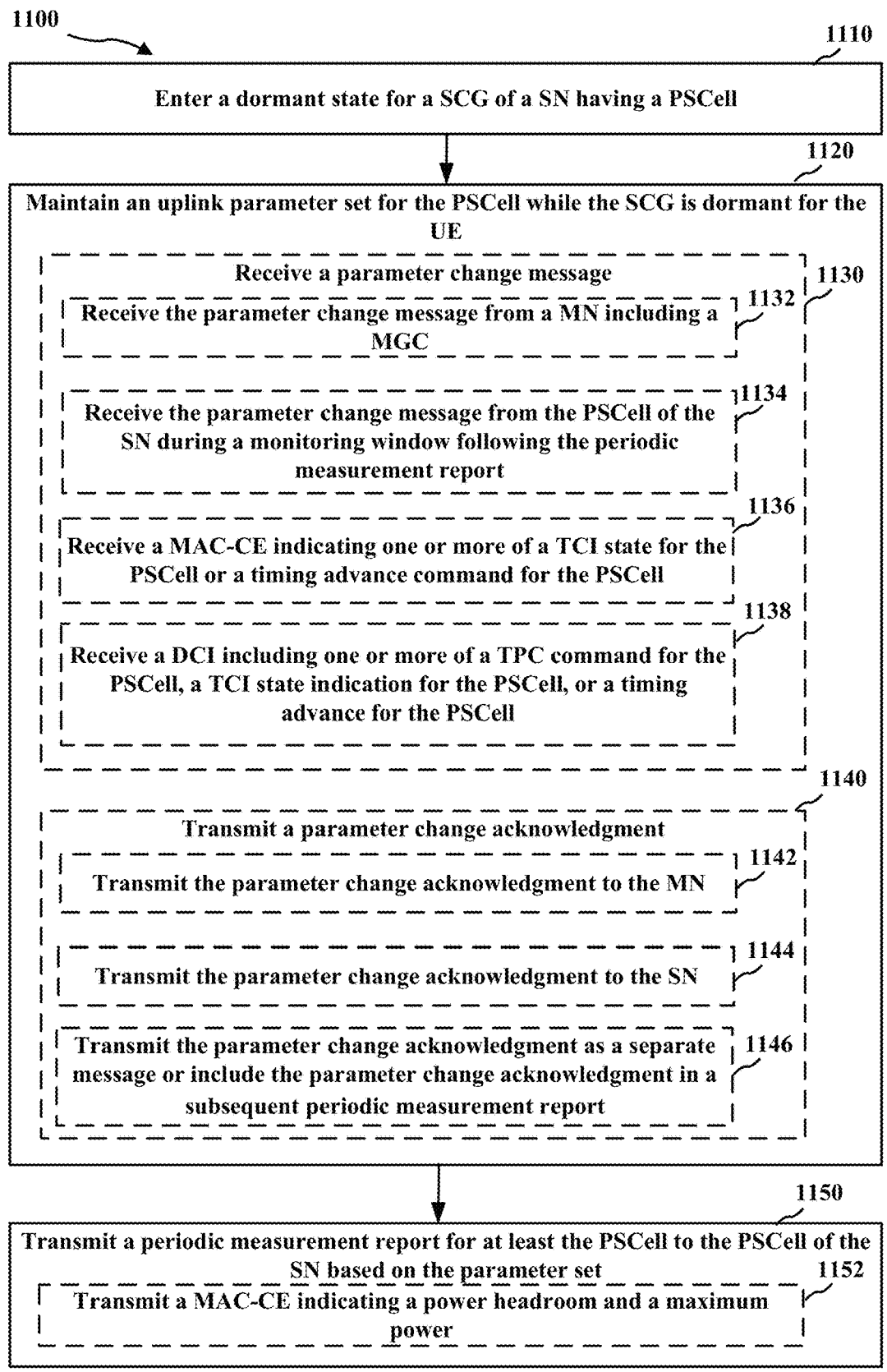
FIG. 11 is a flowchart of an example of a method of wireless communication for a UE.

FIG. 11 is a flowchart of an example method 1100 for monitoring cells of an SCG while operating in an SCG dormancy state. The method 1100 may be performed by a UE (such as the UE 104, which may include the memory 360 and which may be the entire UE 104 or a component of the UE 104 such as the dormancy component 140, TX processor 368, the RX processor 356, or the controller/processor 359). The method 1100 may be performed by the dormancy component 140 in communication with the dormancy control component 198 of the base station 102.

At block 1110, the method 1100 may include entering a dormant state for a SCG of a SN having a PSCell. In an aspect, for example, the UE 104, the RX processor 356 and/or the controller/processor 359 may execute the dormancy component 140 and/or the state component 142 to cause the UE 104 to enter the dormant state for the SCG 410 of the SN 520 having a PSCell 420. For example, the state component 142 may cause the UE 104 to enter the dormant state in response to an RRC message to the UE indicating that the UE should enter the SCG dormancy state. Accordingly, the UE 104, the RX processor 356, and/or the controller/processor 359 executing the dormancy component 140 and/or the state component 142 may provide means for entering a dormant state for a SCG of a SN having a PSCell.

At block 1120, the method 1100 may include maintaining an uplink parameter set for the PSCell while the SCG is dormant for the UE. In an aspect, for example, the UE 104, the RX processor 356 and/or the controller/processor 359 may execute the dormancy component 140 and/or the SCG tracker 144 to maintain the uplink parameter set for the PSCell 420 while the SCG 410 is dormant for the UE. For example, the dormancy component 140 may store the uplink parameter set in the memory 360. The dormancy component 140 may update the stored uplink parameter set based on one or more parameter change messages.

In some implementations, at sub-block 1130, the block 1120 may include receiving a parameter change message. For example, the SCG tracker 144 may receive the parameter change message 562 from the MN 510 or the parameter change message 660 from the SN 520. For instance, in sub-block 1132, the SCG tracker 144 may receive the parameter change message 562 from the MN 510 including a MCG. As another example, in sub-block 1134, the SCG tracker 144 may receive the parameter change message 660 from the PSCell 420 of the SN 520 during a monitoring window 662 following a periodic measurement report 830 (e.g., PUCCH 424). In some implementations, at sub-block 1136, the SCG tracker 144 may receive a MAC-CE 810 indicating one or more of a TCI state (e.g., TCI state activation 812) for the PSCell or a timing advance command 814 for the PSCell. In some implementations, at sub-block 1138, the SCG tracker 144 may receive a DCI 820 including one or more of a TPC command 824 for the PSCell, a TCI state indication 822 for the PSCell, or a timing advance for the PSCell.

In some implementations, at sub-block 1140, the block 1120 may include transmitting a parameter change acknowledgment. For example, at sub-block 1142, the SCG tracker 144 may transmit the parameter change acknowledgment 570 to the MN 510. As another example, at sub-block 1144, the SCG tracker 144 may transmit the parameter change acknowledgment 670 to the SN 520. In some implementations, at sub-block 1146, the SCG tracker 144 may transmit the parameter change acknowledgment as a separate message or include the parameter change acknowledgment in a subsequent periodic measurement report 830.

Accordingly, in view of the foregoing, the UE 104, the RX processor 356, and/or the controller/processor 359 executing the dormancy component 140 and/or the SCG tracker 144 may provide means for maintaining a parameter set for the PSCell while the SCG is dormant for the UE.

At block 1150, the method 1100 may include transmitting a periodic measurement report for at least the PSCell to the PSCell of the SN based on the uplink parameter set. In an aspect, for example, the UE 104, the RX processor 356 and/or the controller/processor 359 may execute the dormancy component 140 and/or the measurement component 146 to transmit a periodic measurement report for at least the PSCell to the SN based on the uplink parameter set. Transmitting the periodic measurement report may include measuring a reference signal of the PSCell. The UE 104 may optionally measure one or more SCells to include in the measurement report. The UE 104 may transmit the measurement report as a MAC-CE. For instance, at sub-block 1152, the measurement component 146 may transmit a MAC-CE 532 indicating a power headroom 834 and a maximum power 836. Accordingly, the UE 104, the RX processor 356, and/or the controller/processor 359 executing the dormancy component 140 and/or the state component 142 may provide means for transmitting a periodic measurement report to the SN based on the parameter set.

FIG. 12 is a flowchart of an example method 1200 for controlling a UE that is operating in an SCG dormancy state. The method 1200 may be performed by a base station (such as the base station 102, which may include the memory 376 and which may be the entire base station 102 or a component of the base station 102 such as the dormancy control component 198, TX processor 316, the RX processor 370, or the controller/processor 375). The method 1200 may be performed by the dormancy control component 198 in communication with the dormancy component 140 of the UE 104.

At block 1210, the method 1100 may include determining that a UE has entered a dormant state for the SCG including the PSCell. In an aspect, for example, the base station 102, the controller/processor 375, and/or the TX processor 316 may execute the dormancy control component 198 and/or the UE state component 840 to determine that the UE 104 has entered a dormant state for the SCG 410 including the PSCell 420. For example, the UE state component 840 may transmit an RRC message to the UE indicating that the UE should enter the SCG dormancy state and receive a state change indication from the UE. Accordingly, the base station 102, the controller/processor 375, and/or the TX processor 316 executing the dormancy control component 198 and/or the UE state component 840 may provide means for determining that a UE has entered a dormant state for a SN including the PSCell and the SCG.

At block 1220, the method 1100 may include maintaining an uplink parameter set for the UE for the PSCell while the UE is dormant for the SCG. In an aspect, for example, the base station 102, the controller/processor 375, and/or the TX processor 316 may execute the dormancy control component 198 and/or the parameter set component 842 to maintain the uplink parameter set for the UE 104 for the PSCell while the UE is dormant for the SCG. For example, the dormancy control component 198 may store the uplink parameter set for the UE in the memory 376. The dormancy control component 198 may transmit a parameter change message to control the UE 104 to update a local version of the parameter set. In some implementations, at sub-block 1222, the block 1220 may include determining a parameter change based on the periodic measurement report. For example, the parameter set component 842 may determine the parameter change based on the periodic measurement report 830. In some implementations, at sub-block 1224, the block 1220 may include maintaining the parameter set for one or more secondary cells of the SCG. For example, the parameter set component 842 may maintain the uplink parameter set for one or more of the SCells 430 of the SCG 410.

In some implementations, at sub-block 1230, the block 1220 may include transmitting a parameter change message indicating the parameter change to the UE. For example, the parameter set component 842 may transmit the parameter change message 560 or the parameter change message 660. In some implementations, at sub-block 1232, the parameter set component 842 may transmit the parameter change message 560 via the MN 510 including the MCG. In some implementations, at sub-block 1234, the parameter set component 842 may transmit the parameter change message 660 from the PSCell 420 of the SN 520 during a monitoring window 662 following the periodic measurement report 830 (e.g., PUCCH 424 in FIG. 6). In some implementations, at sub-block 1236, the parameter set component 842 may transmit a MAC-CE 810 indicating one or more of a TCI state (e.g., TCI state activation 812) for the PSCell or a timing advance command 814 for the PSCell. In some implementations, at sub-block 1238, the parameter set component 842 may transmit a DCI 820 including one or more of a TPC command 824 for the PSCell, a TCI state indication 822 for the PSCell, or a timing advance for the PSCell.

In some implementations, at sub-block 1240, the block 1220 may include receiving a parameter change acknowledgment. For example, at sub-block 1242, the parameter set component 842 may receive the parameter change ACK 572 via the MN 510. As another example, at sub-block 1244, the parameter set component 842 may receive the parameter change ACK 670 from the UE 104.

Accordingly, in view of the foregoing, the base station 102, the controller/processor 375, and/or the TX processor 316 executing the dormancy control component 198 and/or the parameter set component 842 may provide means for maintaining an uplink parameter set for the UE for the PSCell while the UE is dormant for the SCG.

At block 1250, the method 1100 may include receiving a periodic measurement report from the UE for at least the PSCell based on the uplink parameter set. In an aspect, for example, the base station 102, the controller/processor 375, and/or the TX processor 316 may execute the dormancy control component 198 and/or the report receiving component 844 to receive the periodic measurement report from the UE based on the uplink parameter set. For example, at sub-block 1252, the report receiving component 844 may receive a MAC-CE 832 indicating a power headroom 834 and a maximum power 836. Accordingly, the base station 102, the controller/processor 375, and/or the TX processor 316 executing the dormancy control component 198 and/or the report receiving component 844 may provide means for receiving a periodic measurement report from the UE based on the uplink parameter set.

Some Further Example Clauses

Implementation examples are described in the following numbered clauses:

1. A method of wireless communication, comprising, at a user equipment (UE):
   entering a dormant state for a secondary cell group (SCG) of a secondary network (SN) having a primary serving cell (PSCell);
   maintaining an uplink parameter set for the PSCell while the SCG is dormant for the UE; and
   transmitting a periodic measurement report for at least the PSCell to the PSCell of the SN based on the uplink parameter set.
2. The method of clause 1, wherein maintaining the uplink parameter set comprises:
   receiving a parameter change message; and
   transmitting a parameter change acknowledgment.
3. The method of clause 2, wherein receiving the parameter change message comprises receiving the parameter change message from a master network (MN) including a master cell group (MCG), wherein transmitting the parameter change acknowledgment comprises transmitting the parameter change acknowledgment to the MN.
4. The method of clause 2, wherein receiving the parameter change message comprises receiving the parameter change message from the PSCell of the SN during a monitoring window following the periodic measurement report, wherein transmitting the parameter change acknowledgment comprises transmitting the parameter change acknowledgment to the SN.
5. The method of clause 4, wherein transmitting the parameter change acknowledgment comprises transmitting a separate message for the parameter change acknowledgment or including the parameter change acknowledgment in a subsequent periodic measurement report.
6. The method of clause 2, wherein receiving the parameter change message comprises receiving the parameter change message from a master network (MN) including a master cell group (MCG), wherein transmitting the parameter change acknowledgment comprises transmitting the parameter change acknowledgment to the SN.
7. The method of any of clauses 2-6, wherein receiving the parameter change message comprises receiving a media access control (MAC) control element (MAC-CE) indicating one or more of a transmission configuration indicator (TCI) state for the PSCell or a timing advance command for the PSCell.
8. The method of clause 7, wherein the MAC-CE includes at least one of a TCI state for one or more secondary cells of the SCG or a timing advance command for the one or more secondary cells of the SCG.
9. The method of any of clauses 2-6, wherein receiving the parameter change message comprises receiving a downlink control information (DCI) including one or more of a transmit power control (TPC) command for the PSCell, a transmission configuration indication (TCI) state indication for the PSCell, or a timing advance for the PSCell.
10. The method of clause 9, wherein the DCI includes at least one of a TPC command for one or more secondary cells of the SCG or a TCI state indication for the one or more secondary cells of the SCG.
11. The method of any of clauses 2-10, wherein transmitting the periodic measurement report comprises transmitting a MAC-CE indicating a power headroom and a maximum power.
12. The method of clause 11, wherein the MAC-CE includes a power headroom and a maximum power for multiple secondary cells.
13. The method of any of clauses 1-12, wherein maintaining the uplink parameter set comprises maintaining the uplink parameter set for one or more secondary cells of the SCG.
14. A method of wireless communication, comprising, by a primary serving cell (PSCell) of a secondary cell group (SCG) in a secondary network (SN):
   determining that a UE has entered a dormant state for the SCG including the PSCell;
   maintaining an uplink parameter set for the UE for the PSCell while the UE is dormant for the SCG; and
   receiving a periodic measurement report from the UE for at least the PSCell based on the uplink parameter set.
15. The method of clause 14, wherein maintaining the uplink parameter set comprises:
   determining a parameter change based on the periodic measurement report;
   transmitting a parameter change message indicating the parameter change to the UE; and
   receiving a parameter change acknowledgment.
16. The method of clause 15, wherein transmitting the parameter change message comprises transmitting the parameter change message via a master network (MN) including a master cell group (MCG), wherein receiving the parameter change acknowledgment comprises receiving the parameter change acknowledgment via the MN.

17. The method of clause 15, wherein transmitting the parameter change message comprises transmitting the parameter change message from the PSCell of the SN during a monitoring window following the periodic measurement report, wherein receiving the parameter change acknowledgment comprises receiving the parameter change acknowledgment from the UE.

18. The method of clause 17, wherein receiving the parameter change acknowledgment comprises receiving a separate message for the parameter change acknowledgment or receiving the parameter change acknowledgment in a subsequent periodic measurement report.

19. The method of clause 15, wherein transmitting the parameter change message comprises transmitting the parameter change message via a master network (MN) including a master cell group (MCG), wherein receiving the parameter change acknowledgment comprises receiving the parameter change acknowledgment from the SN.

20. The method of any of clauses 15-19, wherein transmitting the parameter change message comprises transmitting a media access control (MAC) control element (MAC-CE) indicating one or more of a transmission configuration indicator (TCI) state for the PSCell or a timing advance command for the PSCell.

21. The method of clause 20, wherein the MAC-CE includes at least one of a TCI state for one or more secondary cells of the SCG or a timing advance command for the one or more secondary cells of the SCG.

22. The method of any of clauses 15-19, wherein transmitting the parameter change message comprises transmitting a downlink control information (DCI) including one or more of a transmit power control (TPC) command for the PSCell, a transmission configuration indication (TCI) state indication for the PSCell, or a timing advance for the PSCell.

23. The method of clause 22, wherein the DCI includes at least one of a TPC command for one or more secondary cells of the SCG or a TCI state indication for the one or more secondary cells of the SCG.

24. The method of any of clauses 15-23, wherein receiving the periodic measurement report comprises receiving a MAC-CE indicating a power headroom and a maximum power.

25. The method of clause 24, wherein the MAC-CE includes a power headroom and a maximum power for multiple secondary cells.

26. The method of any of clauses 14-25, wherein maintaining the uplink parameter set comprises maintaining the uplink parameter set for one or more secondary cells of the SCG.

27. An apparatus of a user equipment (UE) for wireless communication, comprising:
a memory storing computer-executable instructions; and
at least one processor coupled to the memory and configured to execute the computer-executable instructions to:
enter a dormant state for a secondary cell group (SCG) of a secondary network (SN) having a primary serving cell (PSCell);
maintain an uplink parameter set for the PSCell while the SCG is dormant for the UE; and
transmit a periodic measurement report for at least the PSCell to the PSCell of the SN based on the uplink parameter set.

28. The apparatus of clause 27, wherein to maintain the uplink parameter set, the at least one processor is configured to:
receive a parameter change message; and
transmit a parameter change acknowledgment.

29. The apparatus of clause 28, wherein the at least one processor is configured to receive the parameter change message from a master network (MN) including a master cell group (MCG) and transmit the parameter change acknowledgment to the MN.

30. The apparatus of clause 28, wherein the at least one processor is configured to receive the parameter change message from the PSCell of the SN during a monitoring window following the periodic measurement report and transmit the parameter change acknowledgment to the SN.

31. The apparatus of clause 30, wherein the at least one processor is configured to transmit a separate message for the parameter change acknowledgment or include the parameter change acknowledgment in a subsequent periodic measurement report.

32. The apparatus of any of clauses 28, wherein the at least one processor is configured to receive the parameter change message from a master network (MN) including a master cell group (MCG) and transmit the parameter change acknowledgment to the SN.

33. The apparatus of any of clauses 28-32, wherein the at least one processor is configured to receive the parameter change message as a media access control (MAC) control element (MAC-CE) indicating one or more of a transmission configuration indicator (TCI) state for the PSCell or a timing advance command for the PSCell.

34. The apparatus of clause 33, wherein the MAC-CE includes at least one of a TCI state for one or more secondary cells of the SCG or a timing advance command for the one or more secondary cells of the SCG.

35. The apparatus of any of clauses 28-32, wherein the at least one processor is configured to receive the parameter change message as a downlink control information (DCI) including one or more of a transmit power control (TPC) command for the PSCell, a transmission configuration indication (TCI) state indication for the PSCell, or a timing advance for the PSCell.

36. The apparatus of clause 35, wherein the DCI includes at least one of a TPC command for one or more secondary cells of the SCG or a TCI state indication for the one or more secondary cells of the SCG.

37. The apparatus of any of clauses 28-36, wherein the at least one processor is configured to transmit the parameter change message as a MAC-CE indicating a power headroom and a maximum power.

38. The apparatus of clause 37, wherein the MAC-CE includes a power headroom and a maximum power for multiple secondary cells.

39. The apparatus of any of clauses 27-38, wherein the at least one processor is configured to maintain the uplink parameter set for one or more secondary cells of the SCG.

40. An apparatus of a primary serving cell (PSCell) of a secondary cell group (SCG) in a secondary network (SN) for wireless communication, comprising:
a memory storing computer-executable instructions; and
at least one processor coupled to the memory and configured to execute the computer-executable instructions to:
determine that a UE has entered a dormant state for the SCG including the PSCell;
maintain an uplink parameter set for the UE for the PSCell while the UE is dormant for the SCG; and receive a periodic measurement report from the UE for at least the PSCell based on the uplink parameter set.

41. The apparatus of clause 40, wherein to maintain the uplink parameter set, the at least one processor is configured to:
determine a parameter change based on the periodic measurement report;
transmit a parameter change message indicating the parameter change to the UE; and
receive a parameter change acknowledgment.

42. The apparatus of clause 41, wherein the at least one processor is configured to transmit the parameter change message via a master network (MN) including a master cell group (MCG) and receive the parameter change acknowledgment via the MN.

43. The apparatus of clause 41, wherein the at least one processor is configured to transmit the parameter change message from the PSCell of the SN during a monitoring window following the periodic measurement report and receive the parameter change acknowledgment from the UE.

44. The apparatus of clause 43, wherein the at least one processor is configured to receive the parameter change acknowledgment as a separate message for the parameter change acknowledgment or receive the parameter change acknowledgment in a subsequent periodic measurement report.

45. The apparatus of clause 41, wherein the at least one processor is configured to transmit the parameter change message via a master network (MN) including a master cell group (MCG) and receive the parameter change acknowledgment from the SN.

46. The apparatus of any of clauses 41-45, wherein the at least one processor is configured to transmit the parameter change message as a media access control (MAC) control element (MAC-CE) indicating one or more of a transmission configuration indicator (TCI) state for the PSCell or a timing advance command for the PSCell.

47. The apparatus of clause 46, wherein the MAC-CE includes at least one of a TCI state for one or more secondary cells of the SCG or a timing advance command for the one or more secondary cells of the SCG.

48. The apparatus of any of clauses 41-45, wherein the at least one processor is configured to transmit the parameter change message as a downlink control information (DCI) including one or more of a transmit power control (TPC) command for the PSCell, a transmission configuration indication (TCI) state indication for the PSCell, or a timing advance for the PSCell.

49. The apparatus of clause 48, wherein the DCI includes at least one of a TPC command for one or more secondary cells of the SCG or a TCI state indication for the one or more secondary cells of the SCG.

50. The apparatus of any of clauses 41-49, wherein the at least one processor is configured to receive a MAC-CE indicating a power headroom and a maximum power.

51. The apparatus of clause 50, wherein the MAC-CE includes a power headroom and a maximum power for multiple secondary cells.

52. The apparatus of any of clauses 40-51, wherein the at least one processor is configured to maintain the uplink parameter set for one or more secondary cells of the SCG.

53. An apparatus of a user equipment (UE) for wireless communication, comprising:
means for entering a dormant state for a secondary cell group (SCG) of a secondary network (SN) having a primary serving cell (PSCell);
means for maintaining an uplink parameter set for the PSCell while the SCG is dormant for the UE; and
means for transmitting a periodic measurement report for at least the PSCell to the PSCell of the SN based on the uplink parameter set.

54. The apparatus of clause 53, wherein the means for maintaining the uplink parameter set is configured to:
receive a parameter change message; and
transmit a parameter change acknowledgment.

55. The apparatus of clause 54, wherein the means for maintaining the uplink parameter set is configured to receive the parameter change message from a master network (MN) including a master cell group (MCG) and transmit the parameter change acknowledgment to the MN.

56. The apparatus of clause 54, wherein the means for maintaining the uplink parameter set is configured to receive the parameter change message from the PSCell of the SN during a monitoring window following the periodic measurement report and transmit the parameter change acknowledgment to the SN.

57. The apparatus of clause 56, wherein the means for maintaining the uplink parameter set is configured to transmit the parameter change acknowledgment as a separate message or include the parameter change acknowledgment in a subsequent periodic measurement report.

58. The apparatus of clause 54, wherein the means for maintaining the uplink parameter set is configured to receive the parameter change message from a master network (MN) including a master cell group (MCG) and transmit the parameter change acknowledgment to the SN.

59. The apparatus of any of clauses 54-58, wherein the means for maintaining the uplink parameter set is configured to receive the parameter change message as a media access control (MAC) control element (MAC-CE) indicating one or more of a transmission configuration indicator (TCI) state for the PSCell or a timing advance command for the PSCell.

60. The apparatus of clause 59, wherein the MAC-CE includes at least one of a TCI state for one or more secondary cells of the SCG or a timing advance command for the one or more secondary cells of the SCG.

61. The apparatus of any of clauses 54-58, wherein the means for maintaining the uplink parameter set is configured to receive the parameter change message as a downlink control information (DCI) including one or more of a transmit power control (TPC) command for the PSCell, a transmission configuration indication (TCI) state indication for the PSCell, or a timing advance for the PSCell.

62. The apparatus of clause 61, wherein the DCI includes at least one of a TPC command for one or more secondary cells of the SCG or a TCI state indication for the one or more secondary cells of the SCG.

63. The apparatus of any of clauses 54-62, wherein the means for transmitting the periodic measurement report is configured to transmit a MAC-CE indicating a power headroom and a maximum power.

64. The apparatus of clause 63, wherein the MAC-CE includes a power headroom and a maximum power for multiple secondary cells.

65. The apparatus of any of clauses 53-64, wherein the means for maintaining the uplink parameter set is configured to maintain the uplink parameter set for one or more secondary cells of the SCG.

66. An apparatus of a primary serving cell (PSCell) of a secondary cell group (SCG) in a secondary network (SN) for wireless communication, comprising:
means for determining that a UE has entered a dormant state for the SCG including the PSCell;

means for maintaining an uplink parameter set for the UE for the PSCell while the UE is dormant for the SCG; and means for receiving a periodic measurement report for at least the PSCell from the UE based on the uplink parameter set.

67. The apparatus of clause 66, wherein the means for maintaining the uplink parameter set is configured to:

determine a parameter change based on the periodic measurement report;

transmit a parameter change message indicating the parameter change to the UE; and receive a parameter change acknowledgment.

68. The apparatus of clause 67, wherein the means for maintaining the uplink parameter set is configured to transmit the parameter change message via a master network (MN) including a master cell group (MCG) and receive the parameter change acknowledgment via the MN.

69. The apparatus of clause 67, wherein the means for maintaining the uplink parameter set is configured to transmit the parameter change message from the PSCell of the SN during a monitoring window following the periodic measurement report and receive the parameter change acknowledgment from the UE.

70. The apparatus of clause 69, wherein the means for maintaining the uplink parameter set is configured to receive the parameter change acknowledgment as a separate message for the parameter change acknowledgment or receive the parameter change acknowledgment in a subsequent periodic measurement report.

71. The apparatus of clause 67, wherein the means for maintaining the uplink parameter set is configured to transmit the parameter change message via a master network (MN) including a master cell group (MCG) and receive the parameter change acknowledgment from the SN.

72. The apparatus of any of clauses 67-71, wherein the means for maintaining the uplink parameter set is configured to transmit the parameter change message as a media access control (MAC) control element (MAC-CE) indicating one or more of a transmission configuration indicator (TCI) state for the PSCell or a timing advance command for the PSCell.

73. The apparatus of clause 72, wherein the MAC-CE includes at least one of a TCI state for one or more secondary cells of the SCG or a timing advance command for the one or more secondary cells of the SCG.

74. The apparatus of any of clauses 67-71, wherein the means for maintaining the uplink parameter set is configured to transmit the parameter change message as a downlink control information (DCI) including one or more of a transmit power control (TPC) command for the PSCell, a transmission configuration indication (TCI) state indication for the PSCell, or a timing advance for the PSCell.

75. The apparatus of clause 74, wherein the DCI includes at least one of a TPC command for one or more secondary cells of the SCG or a TCI state indication for the one or more secondary cells of the SCG.

76. The apparatus of any of clauses 67-75, wherein the means for receiving the periodic measurement report is configured to receive a MAC-CE indicating a power headroom and a maximum power.

77. The apparatus of clause 76, wherein the MAC-CE includes a power headroom and a maximum power for multiple secondary cells.

78. The apparatus of any of clauses 66-77, wherein the means for maintaining the uplink parameter set is configured to maintain the uplink parameter set for one or more secondary cells of the SCG.

79. A non-transitory computer-readable medium storing computer executable code, the code when executed by a processor of a user equipment (UE) causes the processor to:

enter a dormant state for a secondary cell group (SCG) of a secondary network (SN) having a primary serving cell (PSCell);

maintain an uplink parameter set for the PSCell while the SCG is dormant for the UE; and transmit a periodic measurement report for at least the PSCell to the PSCell of the SN based on the uplink parameter set.

80. The non-transitory computer-readable medium of clause 79, wherein the code to maintain the uplink parameter set comprises code to:

receive a parameter change message; and transmit a parameter change acknowledgment.

81. The non-transitory computer-readable medium of clause 80, wherein the code to receive the parameter change message comprises code to receive the parameter change message from a master network (MN) including a master cell group (MCG), wherein the code to transmit the parameter change acknowledgment comprises code to transmit the parameter change acknowledgment to the MN.

82. The non-transitory computer-readable medium of clause 80, wherein the code to receive the parameter change message comprises code to receive the parameter change message from the PSCell of the SN during a monitoring window following the periodic measurement report, wherein the code to transmit the parameter change acknowledgment comprises code to transmit the parameter change acknowledgment to the SN.

83. The non-transitory computer-readable medium of clause 82, wherein the code to transmit the parameter change acknowledgment comprises code to transmit a separate message for the parameter change acknowledgment or include the parameter change acknowledgment in a subsequent periodic measurement report.

84. The non-transitory computer-readable medium of clause 80, wherein the code to receive the parameter change message comprises code to receive the parameter change message from a master network (MN) including a master cell group (MCG), wherein the code to transmit the parameter change acknowledgment comprises code to transmit the parameter change acknowledgment to the SN.

85. The non-transitory computer-readable medium of any of clauses 80-84, wherein the code to receive the parameter change message comprises code to receive a media access control (MAC) control element (MAC-CE) indicating one or more of a transmission configuration indicator (TCI) state for the PSCell or a timing advance command for the PSCell.

86. The non-transitory computer-readable medium of clause 85, wherein the MAC-CE includes at least one of a TCI state for one or more secondary cells of the SCG or a timing advance command for the one or more secondary cells of the SCG.

87. The non-transitory computer-readable medium of any of clauses 80-84, wherein the code to receive the parameter change message comprises code to receive a downlink control information (DCI) including one or more of a transmit power control (TPC) command for the PSCell, a transmission configuration indication (TCI) state indication for the PSCell, or a timing advance for the PSCell.

88. The non-transitory computer-readable medium of clause 87, wherein the DCI includes at least one of a TPC command for one or more secondary cells of the SCG or a TCI state indication for the one or more secondary cells of the SCG.

89. The non-transitory computer-readable medium of any of clauses 80-88, wherein the code to transmit the periodic measurement report comprises code to transmit a MAC-CE indicating a power headroom and a maximum power.

90. The non-transitory computer-readable medium of clause 89, wherein the MAC-CE includes a power headroom and a maximum power for multiple secondary cells.

91. The non-transitory computer-readable medium of any of clauses 79-90, wherein the code to maintain the uplink parameter set comprises code to maintain the uplink parameter set for one or more secondary cells of the SCG.

92. A non-transitory computer-readable medium storing computer executable code, the code when executed by a processor of a primary serving cell (PSCell) of a secondary cell group (SCG) in a secondary network (SN) causes the processor to:
    determine that a UE has entered a dormant state for the SCG including the PSCell;
    maintain an uplink parameter set for the UE for the PSCell while the UE is dormant for the SCG; and
    receive a periodic measurement report for at least the PSCell from the UE based on the uplink parameter set.

93. The non-transitory computer-readable medium of clause 92, wherein the code to maintain the uplink parameter set comprises code to:
    determining a parameter change based on the periodic measurement report;
    transmitting a parameter change message indicating the parameter change to the UE; and
    receiving a parameter change acknowledgment.

94. The non-transitory computer-readable medium of clause 93, wherein the code to transmit the parameter change message comprises code to transmit the parameter change message via a master network (MN) including a master cell group (MCG), wherein the code to receive the parameter change acknowledgment comprises code to receive the parameter change acknowledgment via the MN.

95. The non-transitory computer-readable medium of clause 93, wherein the code to transmit the parameter change message comprises code to transmit the parameter change message from the PSCell of the SN during a monitoring window following the periodic measurement report, wherein the code to receive the parameter change acknowledgment comprises code to receive the parameter change acknowledgment from the UE.

96. The non-transitory computer-readable medium of clause 95, wherein the code to receive the parameter change acknowledgment comprises code to receive a separate message for the parameter change acknowledgment or receiving the parameter change acknowledgment in a subsequent periodic measurement report.

97. The non-transitory computer-readable medium of clause 93, wherein the code to transmit the parameter change message comprises code to transmit the parameter change message via a master network (MN) including a master cell group (MCG), wherein the code to receive the parameter change acknowledgment comprises code to receive the parameter change acknowledgment from the SN.

98. The non-transitory computer-readable medium of any of clauses 93-97, wherein the code to transmit the parameter change message comprises code to transmit a media access control (MAC) control element (MAC-CE) indicating one or more of a transmission configuration indicator (TCI) state for the PSCell or a timing advance command for the PSCell.

99. The non-transitory computer-readable medium of clause 98, wherein the MAC-CE includes at least one of a TCI state for one or more secondary cells of the SCG or a timing advance command for the one or more secondary cells of the SCG.

100. The non-transitory computer-readable medium of any of clauses 93-97, wherein the code to transmit the parameter change message comprises code to transmit a downlink control information (DCI) including one or more of a transmit power control (TPC) command for the PSCell, a transmission configuration indication (TCI) state indication for the PSCell, or a timing advance for the PSCell.

101. The non-transitory computer-readable medium of clause 100, wherein the DCI includes at least one of a TPC command for one or more secondary cells of the SCG or a TCI state indication for the one or more secondary cells of the SCG.

102. The non-transitory computer-readable medium of any of clauses 93-101, wherein the code to receive the periodic measurement report comprises code to receive a MAC-CE indicating a power headroom and a maximum power.

103. The non-transitory computer-readable medium of clause 102, wherein the MAC-CE includes a power headroom and a maximum power for multiple secondary cells.

104. The non-transitory computer-readable medium of any of clauses 92-103, wherein the code to maintain the uplink parameter set comprises code to maintain the uplink parameter set for one or more secondary cells of the SCG.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. An apparatus of a user equipment (UE) for wireless communication, comprising:
   a memory storing computer-executable instructions; and
   at least one processor coupled to the memory and configured to execute the computer-executable instructions to:
      enter a dormant state for a secondary cell group (SCG) of a secondary network (SN) having a primary serving cell (PSCell);
      maintain an uplink parameter set for the PSCell while the SCG is dormant for the UE, wherein the uplink parameter set for the PSCell includes one or more of: cell timing information, transmission control indicator (TCI) state, or uplink transmit power; and
      transmit a periodic measurement report for at least the PSCell to the PSCell of the SN based on the uplink parameter set for the PSCell.

2. The apparatus of claim 1, wherein to maintain the uplink parameter set, the at least one processor is configured to:
   receive a parameter change message; and
   transmit a parameter change acknowledgment.

3. The apparatus of claim 2, wherein the at least one processor is configured to receive the parameter change message from a master network (MN) including a master cell group (MCG) and transmit the parameter change acknowledgment to the MN.

4. The apparatus of claim 2, wherein the at least one processor is configured to receive the parameter change message from the PSCell of the SN during a monitoring window following the periodic measurement report and transmit the parameter change acknowledgment to the SN.

5. The apparatus of claim 4, wherein the at least one processor is configured to transmit a separate message for the parameter change acknowledgment or include the parameter change acknowledgment in a subsequent periodic measurement report.

6. The apparatus of claim 2, wherein the at least one processor is configured to receive the parameter change message from a master network (MN) including a master cell group (MCG) and transmit the parameter change acknowledgment to the SN.

7. The apparatus of claim 2, wherein the at least one processor is configured to receive the parameter change message as a media access control (MAC) control element (MAC-CE) indicating one or more of a transmission configuration indicator (TCI) state for the PSCell or a timing advance command for the PSCell.

8. The apparatus of claim 7, wherein the MAC-CE includes at least one of a TCI state for one or more secondary cells of the SCG or a timing advance command for the one or more secondary cells of the SCG.

9. The apparatus of claim 2, wherein the at least one processor is configured to receive the parameter change message as a downlink control information (DCI) including one or more of a transmit power control (TPC) command for the PSCell, a transmission configuration indication (TCI) state indication for the PSCell, or a timing advance for the PSCell.

10. The apparatus of claim 9, wherein the DCI includes at least one of a TPC command for one or more secondary cells of the SCG or a TCI state indication for the one or more secondary cells of the SCG.

11. The apparatus of claim 2, wherein the at least one processor is configured to transmit the parameter change acknowledgment as a MAC-CE indicating a power headroom and a maximum power.

12. The apparatus of claim 11, wherein the MAC-CE includes a power headroom and a maximum power for multiple secondary cells.

13. The apparatus of claim 1, wherein the at least one processor is configured to maintain the uplink parameter set for one or more secondary cells of the SCG.

14. An apparatus of a primary serving cell (PSCell) of a secondary cell group (SCG) in a secondary network (SN) for wireless communication, comprising:
   a memory storing computer-executable instructions; and
   at least one processor coupled to the memory and configured to execute the computer-executable instructions to:
      determine that a UE has entered a dormant state for the SCG including the PSCell;
      maintain an uplink parameter set for the UE for the PSCell while the UE is dormant for the SCG wherein the uplink parameter set for the PSCell includes one or more of: cell timing information, transmission control indicator (TCI) state, or uplink transmit power; and
      receive a periodic measurement report for at least the PSCell from the UE based on the uplink parameter set for the PSCell.

15. The apparatus of claim 14, wherein to maintain the uplink parameter set the at least one processor is configured to:
   determine a parameter change based on the periodic measurement report;
   transmit a parameter change message indicating the parameter change to the UE; and
   receive a parameter change acknowledgment.

16. The apparatus of claim 15, wherein the at least one processor is configured to transmit the parameter change message via a master network (MN) including a master cell group (MCG) and receive the parameter change acknowledgment via the MN.

17. The apparatus of claim 15, wherein the at least one processor is configured to transmit the parameter change message from the PSCell of the SN during a monitoring window following the periodic measurement report and receive the parameter change acknowledgment from the UE.

18. The apparatus of claim 17, wherein the at least one processor is configured to receive the parameter change acknowledgment as a separate message for the parameter change acknowledgment or receive the parameter change acknowledgment in a subsequent periodic measurement report.

19. The apparatus of claim 15, wherein the at least one processor is configured to transmit the parameter change message via a master network (MN) including a master cell group (MCG) and receive the parameter change acknowledgment from the SN.

20. The apparatus of claim 15, wherein the at least one processor is configured to transmit the parameter change message as a media access control (MAC) control element (MAC-CE) indicating one or more of a transmission configuration indicator (TCI) state for the PSCell or a timing advance command for the PSCell.

21. The apparatus of claim 20, wherein the MAC-CE includes at least one of a TCI state for one or more secondary cells of the SCG or a timing advance command for the one or more secondary cells of the SCG.

22. The apparatus of claim 15, wherein the at least one processor is configured to transmit the parameter change message as a downlink control information (DCI) including one or more of a transmit power control (TPC) command for the PSCell, a transmission configuration indication (TCI) state indication for the PSCell, or a timing advance for the PSCell.

23. The apparatus of claim 22, wherein the DCI includes at least one of a TPC command for one or more secondary cells of the SCG or a TCI state indication for the one or more secondary cells of the SCG.

24. The apparatus of claim 15, wherein the at least one processor is configured to receive a MAC-CE indicating a power headroom and a maximum power.

25. The apparatus of claim 24, wherein the MAC-CE includes a power headroom and a maximum power for multiple secondary cells.

26. The apparatus of claim 14, wherein the at least one processor is configured to maintain the uplink parameter set for one or more secondary cells of the SCG.

27. A method of wireless communication, comprising, at a user equipment (UE):
  entering a dormant state for a secondary cell group (SCG) of a secondary network (SN) having a primary serving cell (PSCell);
  maintaining an uplink parameter set for the PSCell while the SCG is dormant for the UE wherein the uplink parameter set for the PSCell includes one or more of: cell timing information, transmission control indicator (TCI) state, or uplink transmit power; and
  transmitting a periodic measurement report for at least the PSCell to the PSCell of the SN based on the uplink parameter set for the PSCell.

28. The method of claim 27, wherein maintaining the uplink parameter set comprises:
  receiving a parameter change message; and
  transmitting a parameter change acknowledgment.

29. A method of wireless communication, comprising, by a primary serving cell (PSCell) of a secondary cell group (SCG) in a secondary network (SN):
  determining that a UE has entered a dormant state for the SCG including the PSCell;
  maintaining an uplink parameter set for the UE for the PSCell while the UE is dormant for the SCG wherein the uplink parameter set for the PSCell includes one or more of: cell timing information, transmission control indicator (TCI) state, or uplink transmit power; and
  receiving a periodic measurement report for at least the PSCell from the UE based on the uplink parameter set for the PSCell.

30. The method of claim 29, wherein maintaining the uplink parameter set comprises:
  determining a parameter change based on the periodic measurement report;
  transmitting a parameter change message indicating the parameter change to the UE; and
  receiving a parameter change acknowledgment.

* * * * *